United States Patent
Alden

(10) Patent No.: US 6,396,622 B1
(45) Date of Patent: May 28, 2002

(54) ELECTRO-OPTIC APPARATUS AND PROCESS FOR MULTI-FREQUENCY VARIABLE REFRACTION WITH MINIMIZED DISPERSION

(76) Inventor: Ray M. Alden, 808 Lake Brandon Trail, Raleigh, NC (US) 27610

( * ) Notice: Subject to any disclaimer, the term of this patent is extended or adjusted under 35 U.S.C. 154(b) by 15 days.

(21) Appl. No.: 09/665,191

(22) Filed: Sep. 18, 2000

Related U.S. Application Data

(60) Provisional application No. 60/232,329, filed on Sep. 13, 2000.

(51) Int. Cl.[7] .......... G02F 1/29; G02F 1/1335; G02B 3/10; G02B 3/08
(52) U.S. Cl. .......... 359/315; 359/316; 359/319; 359/721; 359/742; 349/57
(58) Field of Search .......... 359/315, 316, 359/319, 494, 495, 496, 497, 669, 670, 720, 721, 722, 742; 349/57, 196, 198, 200, 74, 75

(56) References Cited

U.S. PATENT DOCUMENTS

| | | | |
|---|---|---|---|
| 4,037,929 A | * | 7/1977 | Bricot et al. ............ 349/200 |
| 4,190,330 A | * | 2/1980 | Berreman ............ 349/200 |
| 4,958,914 A | * | 9/1990 | Owechko et al. ............ 379/77 |
| 5,648,859 A | * | 7/1997 | Hirabayashi et al. .......... 349/9 |

OTHER PUBLICATIONS

Yeh et al., "Optics of Liquid Crystal Displays", Wiley Interscience, New York, 1999, p. 61.*

* cited by examiner

*Primary Examiner*—Georgia Epps
*Assistant Examiner*—David N. Spector

(57) ABSTRACT

The object of the prevent invention is to provide an optical system for producing variable refraction with minimized dispersion. A first material with a first apex angle in a first state and a second material with a second apex angle in a first state produce a first net refraction angle in at least two frequencies of electromagnetic radiation such that the beams that entered parallel exit parallel (to within a controllable tolerance). Said first material with said first apex angle in a second state and said second material with said second apex angle in a second state produce a second net refraction angle in at least two frequencies of electromagnetic radiation such that the beams that entered parallel exit parallel (to within a controllable tolerance).

12 Claims, 13 Drawing Sheets

State1

State2

Losio II

Incident Angles
1          2          3
□ .00    □ .00    □ .00

Material 1 Offset
Start    Stop
☒ .01    .99

Inc.
.001

Material 2 Offset
Start    Stop
☒ .99    ☒ .01

Inc.
.001

Number of Results
1

Load    Save

State 1
Mat 1 Low        Mat 1 High
1.8370000        1.8020000
Mat 2 Low        Mat 2 High
1.7180000        1.7041000

State 2
Mat 1 Low        Mat 1 High
1.5750000        1.5630000
Mat 2 Low        Mat 2 High
1.5150000        1.5098000

Tolerance 1      Tolerance 2      Tolerance 3
0.0003100        0.0003100        0.0003100

Start

ELECTRO-OPTIC APPARATUS AND PROCESS FOR MULTI-FREQUENCY VARIABLE REFRACTION WITH MINIMIZED DISPERSION

CROSS-REFERENCE TO RELATED APPLICATIONS

This application is a non-provisional of No. 60/232,329, filed Sep. 13, 2000. Co-pending applications including related subject mater invented by the present applicant include the following; application Ser. No. 09/596,744 filed Jun. 19, 2000, application Ser. No. 09/358,175 now U.S. Pat. No. 6,230,453, Provisional Patent Application Serial No. 60/110,487 filed Dec. 1, 1998, Provisional Patent Application Serial No. 60/111,708 filed Dec. 10, 1998, and Provisional Patent Applications Serial No. 60/149,059 and Serial No. 60/162,988.

BACKGROUND—FIELD OF INVENTION

This invention relates to electro-optic lenses, such as are used for variably bending light. Such lenses have broad applications including directing and switching light within fiber optics applications, focusing light as with optical lenses, and coherent imaging as with windows that are mounted in a building or on a vehicle, or a television or computer monitor screen. Specifically this invention couples electro-optic components (such as liquid crystals) in series such that a first liquid crystal comprising a first apex angle and a second liquid crystal comprising a second apex angle refract light of at least two frequencies simultaneously with minimal spectral dispersion. Moreover, said first and second liquid crystals so configured produce a first net refractive exiting beam angle with minimal dispersion when in a first state and a second net refractive exiting beam angle with minimal dispersion when in a second state. The invention enables switching between at least two net refractive states each with minimal spectral dispersion upon at least two exiting beam frequencies.

BACKGROUND—DESCRIPTION OF PRIOR ART

The optical properties of liquid crystals have been studied since at least 1888. Particularly since the late 1970's scientific investigation and applications of them has resulted in prolific, widely accepted and profoundly significant uses for their multi-state optical properties.

The dual refractive states associated with liquid crystals referred to as no and ne have been widely studied and applied to provide significant objects and advantages. U.S. Pat. No. 4,037,929 for example utilizes the no and ne states to operate a liquid crystal variable lens to provide a range of focal points. Similarly, U.S. Pat. No. 4,958,914 utilizes the no and ne refractive states to operate an array of liquid crystal variable prisms. U.S. Pat. No. 5,648,859 discloses liquid crystal variable prisms in series to achieve the object of fiber optic communications optical switching. It too relies upon the no and ne refractive states and the resulting range of refractive indices possible in one material.

The prior art contains a large body of information and applications which utilize the no and ne states of liquid crystals. But, it has not anticipated nor addressed the minimization of dispersion caused by different refractive indices for different frequencies of electromagnetic radiation passing through the variable liquid crystal. Particularly as it relates to the challenges posed by dispersion in multiple states (and concomitant multiple refractive indices for any given electromagnetic frequency).

It is well known that any given optical medium (including liquid crystals in the full range between the no and ne states) commonly has differing refractive indices for each frequency of electromagnetic radiation passing therethrough resulting in dispersion of exiting beams that had entered parallel to one another. For over a hundred years, in lens making, this resultant dispersion and symptomatic chromatic distortion have been addressed using crown an flint glasses with complementary spectral dispersion curves. This combination of glasses produces net refraction with minimal dispersion and chromatic distortion. Such glasses nearly always operate only in one state and have only one refractive index for each frequency at any given temperature. By contrast, the problem resolved in the present invention relates to a more complex medium that operates within at least two refractive states for each frequency of electromagnetic radiation.

The complexity of minimizing dispersion in multi-state refractive materials may not have been addressed heretofore because dispersion has not been an issue in the vast majority of applications. Nearly all applications to date have used single frequency electromagnetic radiation or very close frequencies whereby dispersion is not an issue. This is true in most laser and communications applications to date. Also, many of the applications to date are interfacing with photo cells that can retain the information in divergent rays just as efficiently as in parallel rays. Of course, as anyone who has tried to look at the world through a prism knows, the human eye can not efficiently use divergent rays. Such rays, when the eye is close to the dispersing optic, appear as blue and red shading on either side of an object, and as the eye moves away from the dispersing optical element, divergent rays from the same object quickly become an unintelligible blur at just a short distance away. Close-up is where the vast majority of liquid crystal multi-frequency multi-state refraction is utilized (such as with laptop computers). This is another reason why multi-frequency multi-state dispersion has not previously been addressed. The vast majority of applications heretofore involve close up use of exiting divergent rays by either the human eye such as with a laptop or the next in a series of optical components such as in fiber optic switching. Short distances keep dispersion from causing problems. For the previous reasons, multi-frequency multi-state dispersion has not been previously resolved. Solving this problem requires much effort in determining precise prism angles that are required for a minimum of eight refractive indices to cause beams to exit at precise trajectories. Computer software required to establish the precise refractive angles in multi-state materials and to match complementary refractive indices across multiple frequencies is disclosed herein. Also disclosed is software to operate the two materials.

The problem of minimizing the dispersion of at least two parallel beams of differing electromagnetic frequencies caused by liquid crystals operated between at least two states is addressed and resolved herein. It has been heretofore unrecognized that the refractive variability of liquid crystals could be used for additional significant applications if the associated dispersion is eliminated. The present invention retains the refractive variability of liquid crystals while simultaneously providing a reliable and cost effective means to minimize dispersion over an operating range of two materials each have a controllable range of refractive properties and between at least two frequencies of electromagnetic radiation.

SUMMARY

The preferred embodiment of the invention described herein incorporates a series of two variable electro-optic components such as liquid crystal prisms (referred to herein as a couplet) with at least two frequencies of electromagnetic radiation in beams entering parallel to one another and then passing therethrough. The first prism with a first apex angle operating between a first refractive state no and second refractive state ne and the second prism with a second apex angle operating between a first refractive state no and second refractive state ne. In said first state, the couplet producing a first net refracted angle in the beams with minimal dispersion and in said second state, the couplet producing a second net refracted angle in the beams with minimal dispersion. This novel construction has broad applications including directing and switching multi-frequency light within fiber optics applications, producing variable focal length multi-frequency light focus as with optical lenses, and coherent multi-frequency imaging as with windows that are mounted in a building or on a vehicle through which a user can view multiple views with minimal chromatic distortion, or a television or computer monitor screen.

OBJECTS AND ADVANTAGES

Accordingly, several objects and advantages of my invention are apparent. The invention enables multiple frequencies of electromagnetic radiation traveling parallel to be accurately and reliably refracted and exit traveling parallel (within a controllable tolerance). Moreover, utilizing a first prism with a first apex angle operating in a range between a first refractive state no and second refractive state ne and the second prism with a second apex angle operating in a range between a first refractive state no and second refractive state Ne, enables the system to reliably refract multi-frequency beams in multiple directions with minimal dispersion.

Refracting multi-frequency beams with minimum dispersion has many advantages as have been historically made clear. Beams can travel greater distances between optical components or before entering the human eye. This is because the beams are not diverging after refraction as they would be under prior art systems not employing the present invention. Also the lack of beam divergence enables the use of smaller components since the multi-frequency beam stays closer together much longer.

Solving the more complex problem (as herein described) of creating a system for minimizing dispersion in a range between the no and ne states offers the advantage of variable focal length lenses with minimal chromatic distortion throughout the range of focal lengths. Electro-optic variable focal length lenses have been know in the prior art but they had heretofore not addressed the multi-frequency dispersion problem as solved herein.

Computer monitors and television screens employing minimized dispersion are to be used to variably refract images to users over much greater distances without chromatic distortion. Liquid crystal image direction devices heretofore disclosed did not adequately recognize or address the need to minimize dispersion when variably refracting views over distances. The present invention resolves this issue.

Windows in buildings and automobiles utilizing variable refraction with minimized dispersion will be used to change the viewing perspective for users while maintaining chromatic integrity. Heretofore the use of windows as a means to redirect views for the human eye through refraction while minimizing dispersion have been absent from the art. The present invention provides a reliable, light weight, compact means to redirect a user's view through a window and thereby complements the vast work (patent applications now pending referenced at the opening of this document) done in this area by the present inventor.

This novel construction has broad applications including directing and switching multi-frequency light within fiber optics applications, focusing multi-frequency light as with optical lenses, and coherent multi-frequency imaging as with windows that are mounted in a building or on a vehicle, or a television or computer monitor screen.

Many other areas including communications, entertainment, science, optics, telescopy, astronomy, automobile manufacturing, building architecture, and security will benefit from the present invention.

Further objects and advantages will become apparent from a consideration of the drawings and ensuing description.

BRIEF DESCRIPTION OF THE DRAWINGS

The following description of the invention and the related drawings portray a single cell of a electro-optic or liquid crystal couplet designed to produce a range of net refractive states each with minimal dispersion of at least two frequencies of electromagnetic radiation traveling therethrough. They also portray a lens with variable focal length and minimized dispersion. It will be understood, that the concept of the invention may be employed in any substantially light-transmissive component, broadly described as a prism or lens.

The description of the invention relates to and is best understood with relation to the accompanying drawings, in which:

FIG. 7. is a graphical user interface (GUI) for manually inputting data into a software application named Loslo II which is designed to minimize dispersion.

DESCRIPTION AND OPERATION OF THE FIRST PREFERRED EMBODIMENTS

Figure 1:
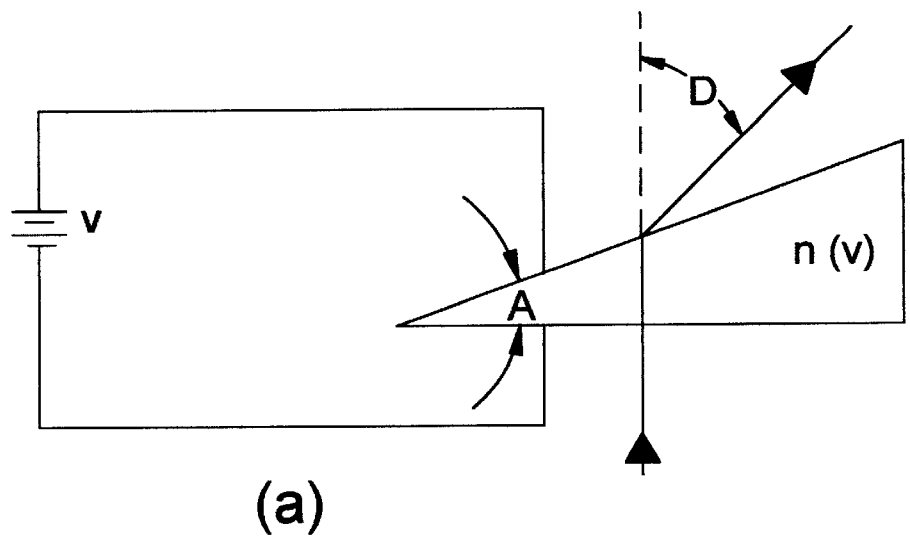
FIG. 1(a). Prior Art, U.S. Pat. No. 4,958,914 (Owechko et al., 1990), illustrates a simple schematic for varying the refractive index of a liquid crystal cell through varying a voltage applied thereto.
FIG. 1(b) of the same patent shows such cells in array.
Figure 1:
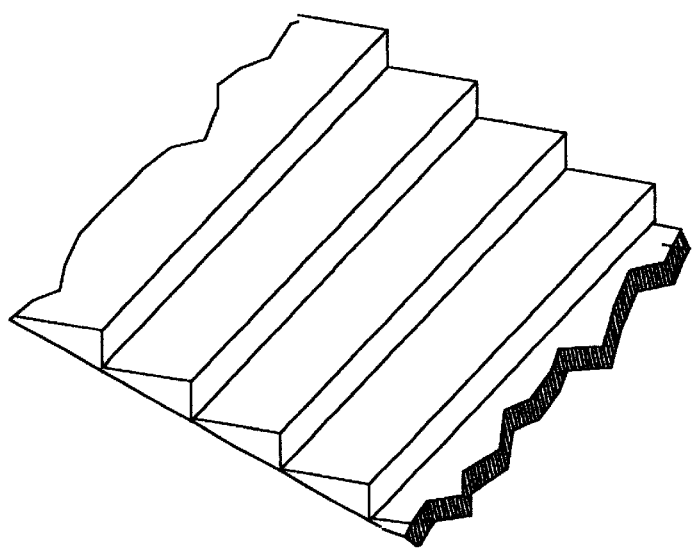

For nearly 30 years, in a multitude of embodiments, the prior art has disclosed changing a refractive index over a range between no and ne as a function of a variable voltage applied to a liquid crystal. FIG. 1a, prior art, U.S. Pat. No. 4,958,914 (Owechko et al., 1990), illustrates a simple circuit schematic for varying the refractive index of an electro-optic material such as a liquid crystal cell with an apex angle of "A" through varying the intensity of an electric field applied thereto. An array of such cells is depicted in FIG. 1b from the same patent. While this and other similar prior art has been used to variably refract light for 30 years, the problem of dispersion has neither been anticipated nor addressed. The complexity of minimizing dispersion in multi-state refractive materials may not have been addressed heretofore because dispersion has not been an issue in the vast majority of applications.

Many applications to date have used single frequency electromagnetic radiation or very close frequencies whereby dispersion is not an issue. This is true in most laser and telecommunications applications to date. Also, many of the applications to date are interfacing with photoelectric cells that can retain the information in divergent rays just as efficiently as in parallel rays. Of course, as anyone who has tried to look at the world through a prism knows, the human eye can not efficiently use divergent rays and such rays when the dispersing optic is close-up to the eye appear as blue and red shading on either side on an object. As the dispersing optic moves away from the eye, the dispersing rays quickly become an unintelligible blur to the human eye. Close-up is where the vast majority of liquid crystal multi-frequency multi-state refraction has been utilized heretofore. This is another reason why multi-frequency multi-state dispersion has not previously been addressed.

The vast majority of applications heretofore involve close up use by either the human eye such as with a laptop or the next in a series of optical components such as fiber optic switching. Short distances keep dispersion from causing problems. For the previous reasons, multi-frequency multi-state dispersion has not been addressed nor resolved in the prior art. Solving this problem requires much effort in determining precise prism angles that are required for a minimum of eight refractive indices to cause beams to exit at precise trajectories. Computer software required to determine the precise apex angles required and the precise matching of complementary refractive indices to achieve a desired net refractive index and minimize dispersion is disclosed herein.

Figure 2:
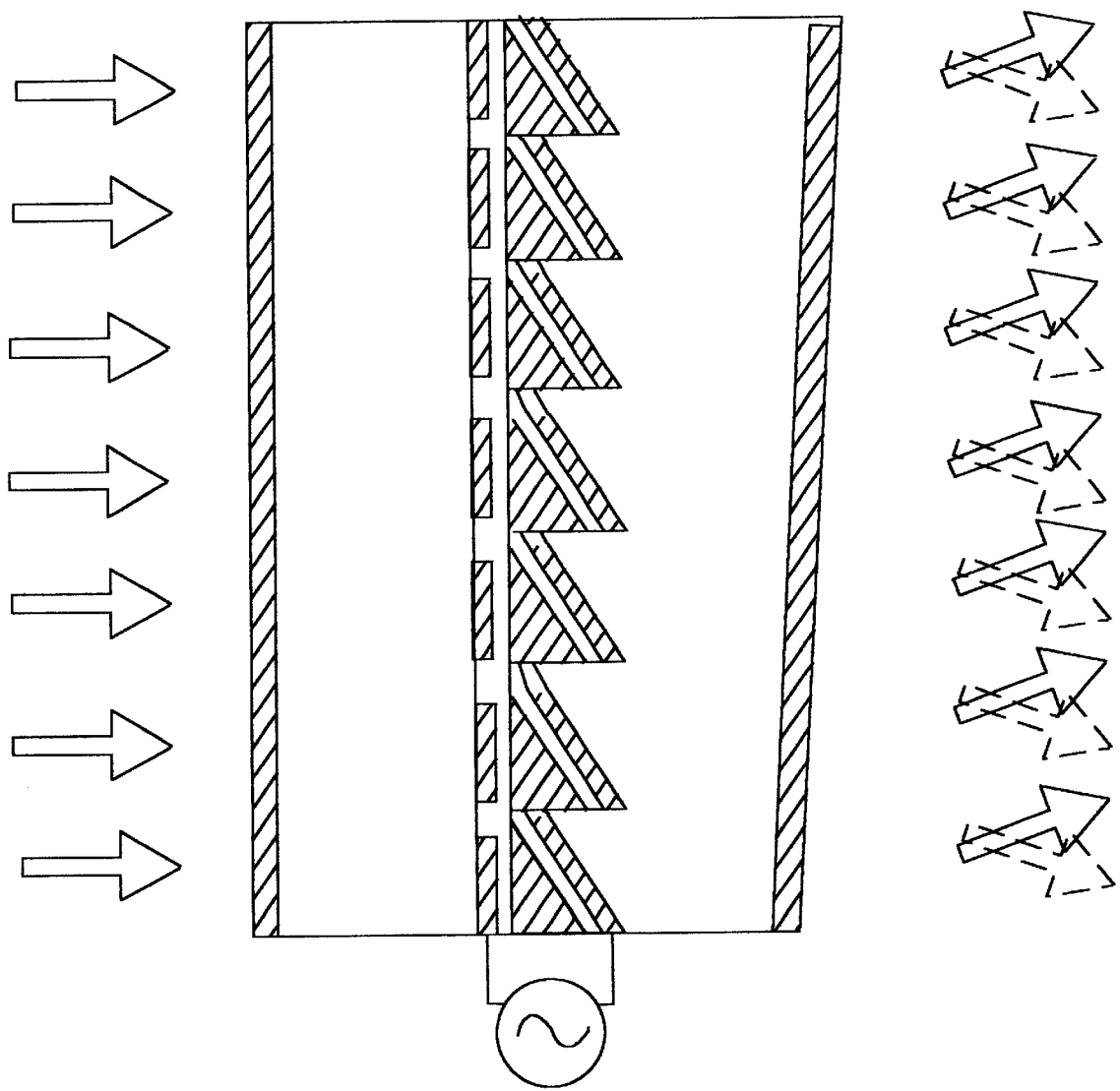
FIG. 2. Prior Art, U.S. Pat. No. 5,648,859 (Hirabayashi et al., 1997), illustrates a voltage variable liquid crystal array with variable refractivity and a second prism angle in series.
Figure 3:
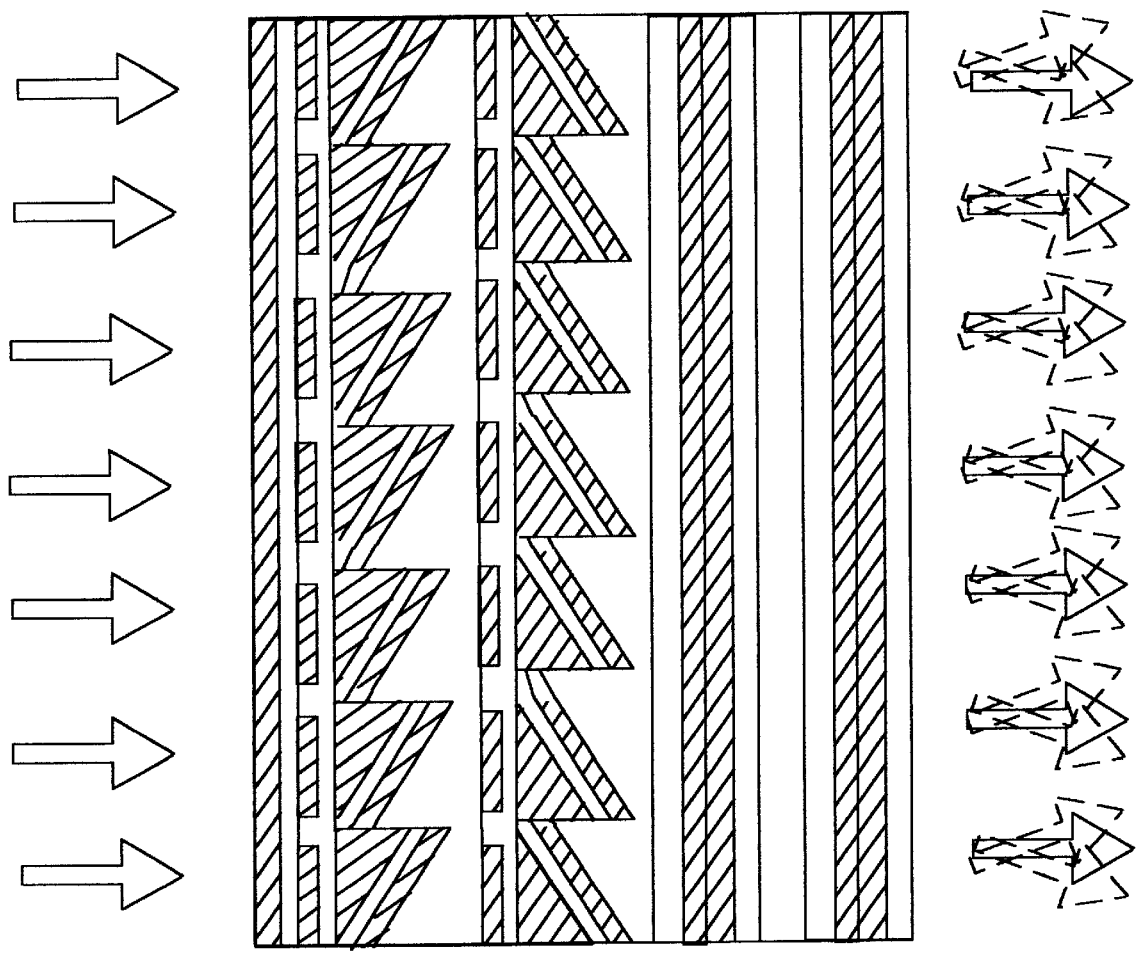
FIG. 3. Prior Art, U.S. Pat. No. 5,648,859 (Hirabayashi et al., 1997), illustrates a voltage variable liquid crystal array in series with a second array with variable refractivity.

For 30 years, prior art has used voltage variable prism arrays in series with other prisms or with other prism arrays to variably refract electromagnetic radiation. FIG. 2, and FIG. 3. Prior Art, prior art, U.S. Pat. No. 5,648,859 (Hirabayashi et al., 1997), illustrates a voltage variable liquid crystal array with variable refractivity and a second prism angle. This arrangement is useful for fiber-optic switching because the distance between optical components is minimal, the refractive indices of frequencies involved are relatively close, and no human vision is required to interpret the signal. This prior art does not disclose a solution for resolving the complexity of minimizing dispersion of multi-frequency beams through at least two refractive states. Disclosed herein is a means to minimize dispersion in materials that retain a constant shape but produce a range of net refractive angles. My invention utilizes the refractive curves of two materials represented by a minimum of eight refractive indices to determine precise apex angles and then to achieve desired net refractive angles while simultaneously minimizing dispersion.

Figure 4:
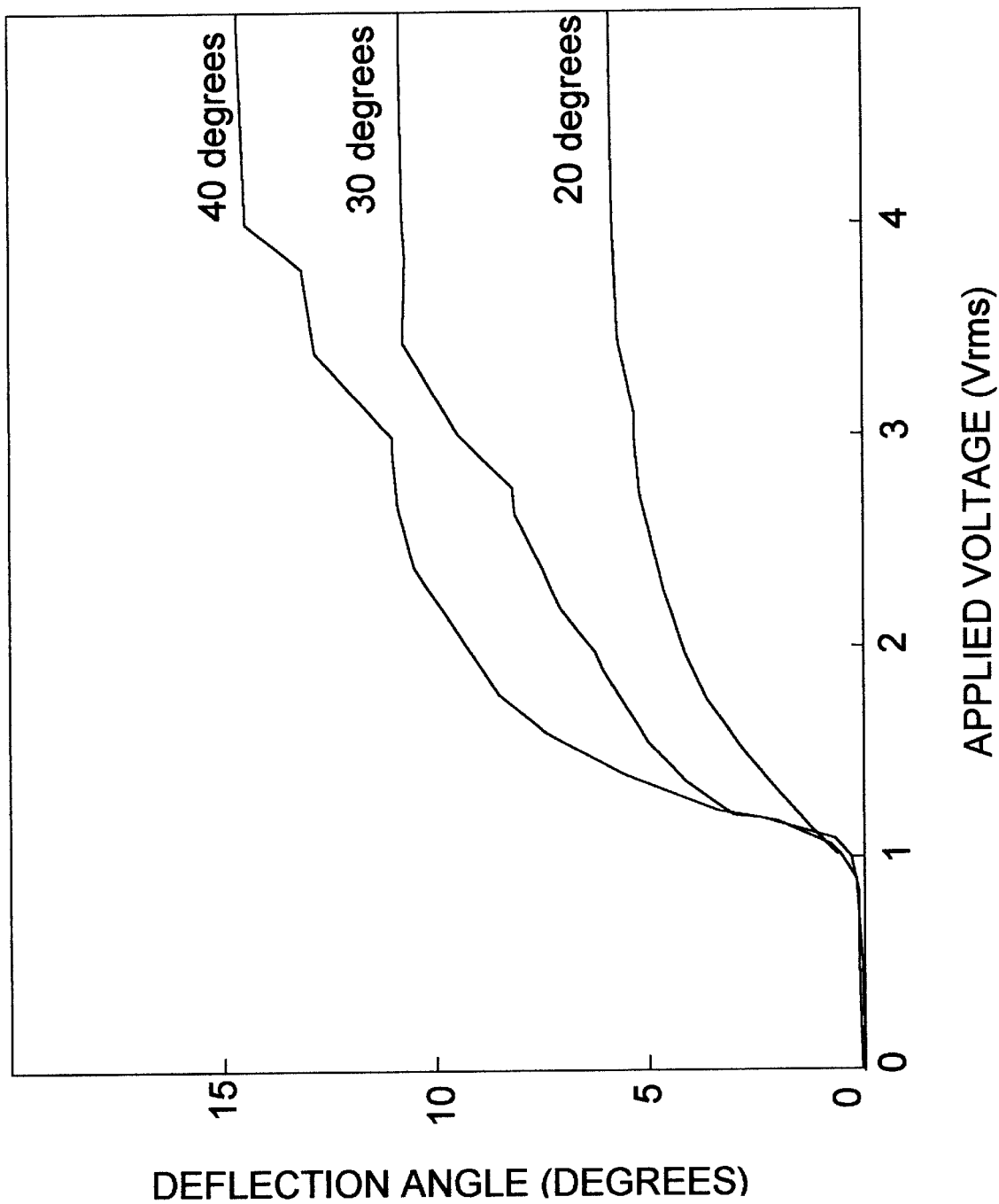
FIG. 4. Prior Art, U.S. Pat. No. 5,648,859 (Hirabayashi et al., 1997), illustrates the deflection (refraction) angle curve possible using liquid crystals at each of three different prism angles when a range of voltages is applied to each.

For decades, prior art has utilized the refraction curves of electro-optic materials to achieve variable refraction optical components. FIG. 4. prior art, U.S. Pat. No. 5,648,859 (Hirabayashi et al., 1997), illustrates the deflection angle curve possible using liquid crystals at each of three different prism angles when a range of voltages is applied to each. No attempt has been made to minimize dispersion. This fact can easily be observed in analyzing the angles which have been selected for use. None of these angles including 20 degrees, 30 degrees, and 40 degrees can be used to reliably provide the maximum refraction range for this material with the minimum dispersion. The present invention can use two points on each of two such curves to establish the required prism angles at which dispersion can be minimized across the range of possible net refraction angles between no and ne.

The present invention utilizes the values from curves similar to FIG. 4, to calculate the voltages to be applied to a first material and to a second material such that the desired refraction angle is achieved with minimized spectral dispersion. The database/memory can incorporate refractive indices of one or more materials incorporating the effects of temperature, voltage, frequency, apex angle, incident angles, refraction angle desired and a controllable dispersion tolerance. Multiple incident angles can be considered simultaneously in the present invention such that the human eye can in effect look through a prism at a three dimensional world with minimized perceived chromatic distortion in multiple directions simultaneously.

Figure 5:
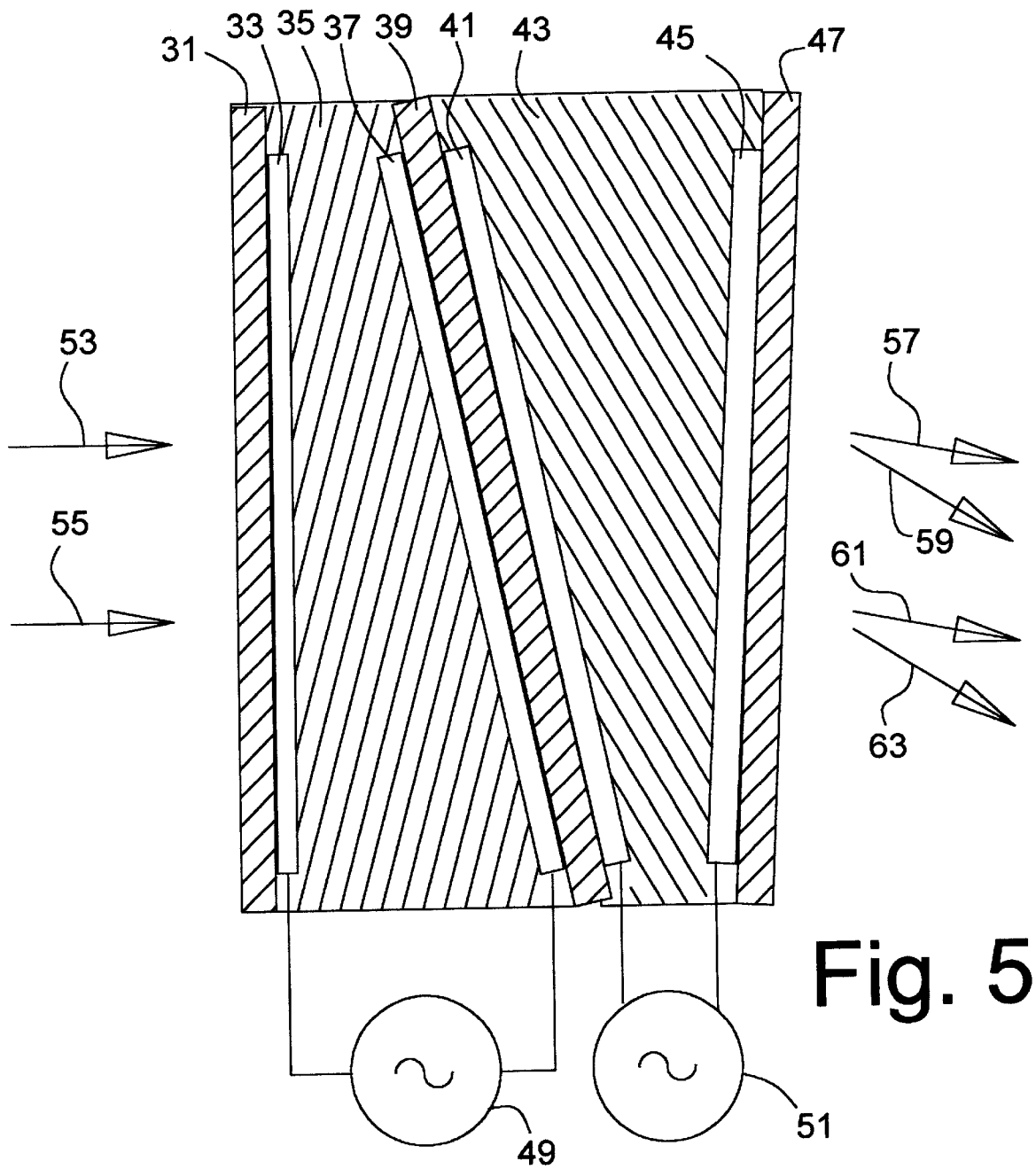
FIG. 5. illustrates the liquid crystal couplet of the present invention.

FIG. 5. illustrates the liquid crystal couplet of the present invention. A first rigid transparent member 31 includes a first surface onto which a first transparent electrode 33 is connected. Together, they form a first side which communicates with a first electro-optic material 35 such as a MBBA (Schiff base) liquid crystal (see Table I below for reference). Forming a second side which communicates with the first electro-optic material is a second transparent electrode 37 which is attached to a first side of a second rigid transparent member 39. A first variable power source 49 is electrically in contact with the first and second transparent electrodes. A second side of the second rigid transparent member is sealable connected to a third transparent electrode 41. Said electrode and rigid member communicating with a first side of a second electro-optic material 43 such as RO-TN-601 liquid crystal (see Table I below for reference). Communicating with a second side of the second electro-optic material is a fourth transparent electrode 45. Said electrode connected to a third rigid transparent member. A second variable power source 51 is electrically in contact with the third and fourth transparent electrodes.

Each rigid member/electrode assembly are permanently positioned at precise angles relative to one another such that each of the electro-optic materials forms a precisely chosen prism apex angle. The first material forming a prism with a first apex angle and the second material forming a prism with a second apex angle. (Determination of the precise angular positioning of these members will be discussed in a later section.).

Some properties of the two electro-optic materials used to illustrate the present invention are presented in Table I. It should be noted that the software of the present invention can utilize any combination of one or more such electro-optic materials. Indeed under the present invention, the first and second electro-optic materials can be made of the same material.

TABLE I

Describes the refractive indices of two liquid crystals in their $\eta o$ and $\eta e$ states at a common temperature and at two frequencies. These data are described by Yeh, P., and Claire, G., Optics of Liquid Crystal Displays, Wiley Interscience Publication, NY, 1999, Page 61.

| Material | Temp. | Wavelength (nm) | $\eta e$ | $\eta o$ |
|---|---|---|---|---|
| MBBA (Schiff base) | 25 Celsius | 508.6 | 1.802 | 1.563 |
| MBBA (Schiff base) | 25 Celsius | 467.8 | 1.837 | 1.575 |
| RO-TN-601 | 25 Celsius | 508.6 | 1.7041 | 1.5098 |
| RO-TN-601 | 25 Celsius | 467.8 | 1.718 | 1.515 |

A first frequency incident beam 53 at a first frequency is caused to enter the assembly. It is refracted by both 35 and 43. The refraction of the first material causes dispersion and the refraction of the second material undoes the dispersion. When a first voltage is applied at 49 and a first voltage is applied at 51, 35 is in a first refractive state and 43 is in a first refractive state, the electromagnetic energy of 53 exits the system on a new trajectory of first beam 57. When a second voltage is applied at 49 and a second voltage is applied at 51, 35 is in a second refractive state and 43 is in a second refractive state, the electromagnetic energy of 53 exits the system on a second new trajectory of first beam 59. A second frequency incident beam 55 at a second frequency is caused to enter the assembly. It is refracted by both 35 and 43. The refraction of the first material causes dispersion and the refraction of the second material undoes the dispersion. When a first voltage is applied at 49 and a first voltage is applied at 51, 35 is in a first refractive state and 43 is in a first refractive state, the electromagnetic energy of 55 exits the system on a new trajectory of second beam 61. When a second voltage is applied at 49 and a second voltage is applied at 51, 35 is in a second refractive state and 43 is in a second refractive state, the electromagnetic energy of 55 exits the system on a second new trajectory of second beam 63. It is very important to note that if 53 is parallel to 55, then 57 is parallel (within a controllable tolerance) to 61, and that 59 is parallel (within a controllable tolerance) to 63.

In Nematic crystals, the process of rubbing to achieve a first state of alignment with a first refractive index and of applying voltage to achieve additional alignments with additional corresponding refractive indices is well known in the prior art and is not discussed in detail herein to avoid redundancy. The advantages of polarizing light versus not polarizing light when working with nematic crystals too is well known and is likewise not discussed herein.

Figure 6A:
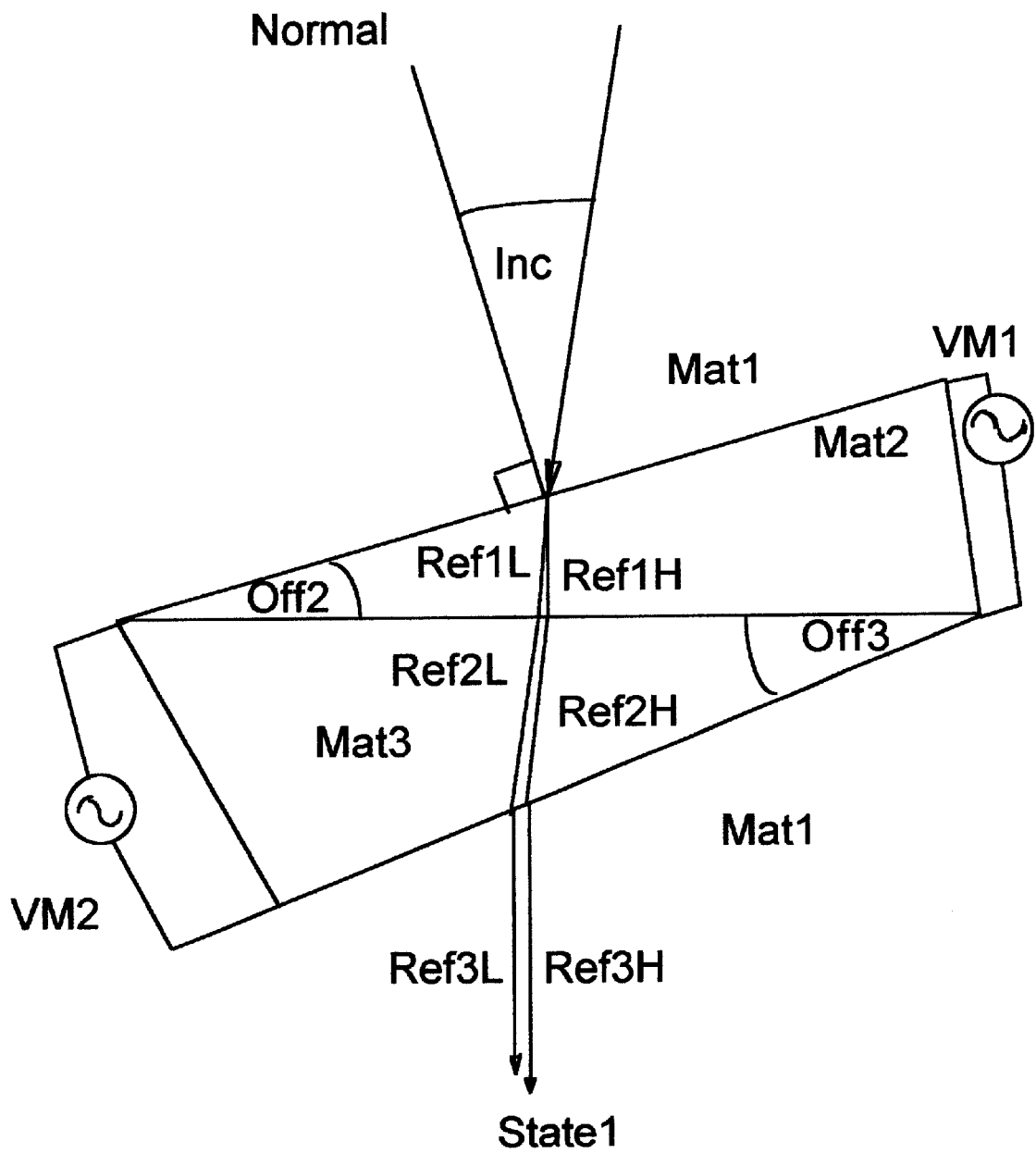
FIG. 6a. is a ray trace diagram illustrating the present invention in State 1 including variables utilized in a computer model to determine how to minimize dispersion as each of two electro-optic materials transition through a range of refractive states.

FIG. 6a. is a ray trace diagram illustrating the present invention in a first net refractive state including variables utilized in the LosloII computer software to determine how to minimize dispersion in a first set of refractive states and the corresponding refractive effects. The symbols generally correspond to the computer software which is employed and disclosed herein. Depicted is a couplet of complementary prism surfaces designed to achieve angular refraction without significant spectral dispersion.

Inc—is the incident angle at which a multi-frequency ray meets a first refractive material. In practice, the system can use one or more incident angles simultaneously to determine voltage required.

Mat1—is air for the purpose of discussion its refractive index is assumed to be 1.

Mat2—is a first transparent electro-optic material with a refractive index through which light passes. It can transition through multiple refractive indices as a function of applied voltage.

VM1—is the variable voltage supply applied to Mat1 to vary refractive indices.

Mat3—is a second transparent electro-optic material with a refractive index through which light passes. It can transition through multiple refractive indices as a function of applied voltage.

VM2—is the variable voltage supply applied to Mat2 to vary refractive indices.

Ref1L—is the refracted trajectory in radians of the first wavelength caused by Mat2 when incident angle is Inc.

Ref1H—is the refracted trajectory in radians of the second wavelength caused by Mat2 when incident angle is Inc Ref2L—is the refracted trajectory in radians of the first wavelength caused by Mat3 when prism angle apex is Off2.

Ref2H—is the refracted trajectory in radians of the second wavelength caused by Mat3 when prism angle apex is Off2.

Ref3L—is the refracted trajectory in radians of the first wavelength upon exiting Mat3 when prism angle apex is Off3. The relative trajectory (Rel in the software) when comparing Ref3L to Ref3H is to approach zero. When Rel equals zero, Ref3L and Ref3H are parallel.

Ref3H—is the refracted trajectory in radians of the second wavelength upon exiting Mat3 when prism angle apex is Off3. The relative trajectory (Rel in the software) when comparing Ref3L to Ref3H is to approach zero. When Rel equals zero, Ref3L and Ref3H are parallel.

Off2—is the prism angle apex formed by Mat2, Off2 is a fixed angle that has been engineered by the computer software disclosed herein to optimally maximize refraction for a range of states and net refractive results while minimizing dispersion when operated in collaboration with Off3 by the computer software herein.

Off3—is the prism angle apex formed by Mat3, Off3 is a fixed angle that has been engineered by the computer software disclosed herein to optimally maximize refraction for a range of states and net refractive results while minimizing dispersion when operated in collaboration with Off2 by the computer software herein.

State1—shows the net relative refracted trajectories of the above set of angles and materials in the first state.

Figure 6B:
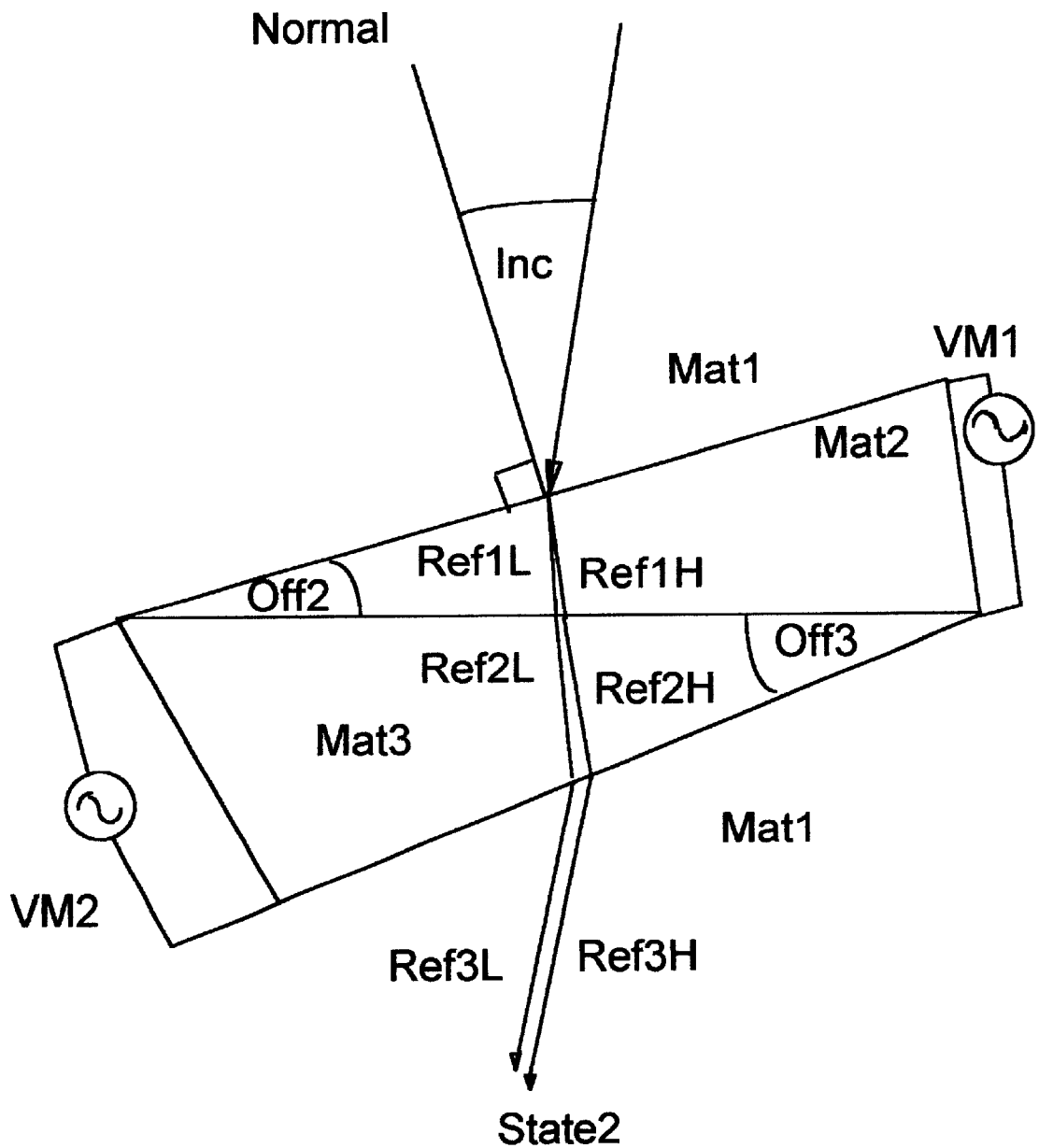
FIG. 6b. is a ray trace diagram illustrating the present invention in State 2 including variables utilized in a computer model to determine how to minimize dispersion as each of two electro-optic materials transition through a range of refractive states.

FIG. 6b. is a ray trace diagram illustrating the present invention in a second net refractive state including variables utilized in a computer model to determine how to minimize dispersion in a second set of refractive states and the corresponding refractive effects. The figure is identical to FIG. 6a except that the refractive values of Mat2 and Mat3 are assumed to be different such that the resultant refraction is different but the exiting rays are still parallel within a controllable tolerance.

State2—shows the net relative refracted trajectories of the above set of angles and materials when Mat2 and Mat3 are each respectively electronically switched a second state.

FIG. 7. is the graphical user interface (GUI) that enables manual user input into the LosloII software incorporated herein. (All angles are in Radians.) Up to three incident angles at which multi-frequency rays meet a first refractive material can be input. The current setting indicates that all rays are incident from one direction (zero) which is perpendicular to Mat2. The Material 2 offset is used to input Off2 manually. Note that the current setting is a range between 0.01 and 0.99 with increments of 0.001. In this mode, the software will check for minimum dispersion across a range of Off2's. Similarly Material 3 Offset can be set at 1 angle or a range of angles. In the current setting, it will check dispersion across a range of Of angles from −0.99 through −0.01 with 0.001 increments. The n material 2 State 1 and State 2 represents the refractive indices of MBBA (Schiff base) at the frequencies listed in Table I above. The n Material 3 State 1 and State 2 represents the refractive indices of RO-TN601 at the frequencies listed in Table I above. The Relative Tolerance enables the user to choose what level of dispersion between the two frequencies is acceptable. Using a higher Relative Tolerance, enables greater refraction angles but also produces greater associated dispersion. At the current setting, only angles that will produce a dispersion angle between the low and high frequencies of 0.00031 radians or less will be reported. The Loslo II software included herewith will report a series of Off2 and Off3 angles that satisfy the specifications that were manually input. Knowing the Off2 and Off3 angles which in combination are optimal for a material enables the user to design a couplet cell that can produce a maximum refraction range with minimal dispersion across the range. Once the system is built with these fixed Off2 and Off3 angles, their fixed values will be input into the LosloII software which can then optimally operate the couplet across the possible refractive range always with minimized dispersion. This is done by using by connecting LosloII to other components as described in FIG. 8.

Any electro-optic material can be used with the present invention. Table II represents a tiny fraction that can be investigated using the manual LosloII GuI and the descriptions described herein and operated using the components in FIG. 8.

TABLE II is an index of refraction for some known electro-optic materials at specified wavelengths, temperatures and for $\eta o$ and $\eta e$ states. These data are described by Yeh, P., and Claire, G., Optics of Liquid Crystal Displays, Wiley Interscience Publication, NY, 1999, Page 61.

| Material | Temp. | Wavelength (nm) | $\eta e$ | $\eta o$ |
|---|---|---|---|---|
| MBBA (Schiff base) | 25 Celsius | 467.8 | 1.837 | 1.575 |
| MBBA (Schiff base) | 25 Celsius | 480 | 1.825 | 1.57 |
| MBBA (Schiff base) | 25 Celsius | 508.6 | 1.802 | 1.563 |
| MBBA (Schiff base) | 25 Celsius | 589 | 1.764 | 1.549 |
| MBBA (Schiff base) | 25 Celsius | 643.8 | 1.749 | 1.544 |
| RO-TN-601 | 25 Celsius | 467.8 | 1.74 | 1.5098 |
| RO-TN-601 | 25 Celsius | 643.848 | 1.74 | 1.5098 |
| RO-TN-601 | 25 Celsius | 643.8508.6 | 1.74 | 1.5098 |
| RO-TN-601 | 25 Celsius | 488,546 | 1.718 | 1.515 |
| K15 (5CB)(BDH, Ltd.) | 25 | 509 | 1.7411 | 1.5443 |
| K15 (5CB)(BDH, Ltd.) | 25 | 577 | 1.7201 | 1.5353 |
| K15 (5CB)(BDH, Ltd.) | 25 | 644 | 1.7072 | 1.5292 |
| K15 (5CB)(BDH, Ltd.) | 30 | 436 | 1.7648 | 1.5624 |
| K15 (5CB)(BDH, Ltd.) | 30 | 509 | 1.725 | 1.5481 |
| K15 (5CB)(BDH, Ltd.) | 30 | 577 | 1.7044 | 1.539 |
| K15 (5CB)(BDH, Ltd.) | 30 | 644 | 1.6926 | 1.5323 |
| E5 (BDH, Ltd) | 20 | 436 | 1.8038 | 1.5447 |
| E5 (BDH, Ltd) | 20 | 509 | 1.7584 | 1.5303 |
| E5 (BDH, Ltd) | 20 | 577 | 1.736 | 1.5228 |
| E5 (BDH, Ltd) | 20 | 644 | 1.7222 | 1.5169 |
| E5 (BDH, Ltd) | 30 | 436 | 1.7856 | 1.5455 |
| E5 (BDH, Ltd) | 30 | 509 | 1.7417 | 1.5318 |
| E5 (BDH, Ltd) | 30 | 577 | 1.7208 | 1.5232 |
| E5 (BDH, Ltd) | 30 | 644 | 1.7071 | 1.5172 |
| E7 (BDH, Ltd.) | 20 | 436 | 1.8208 | 1.544 |
| E7 (BDH, Ltd.) | 20 | 509 | 1.7737 | 1.5311 |
| E7 (BDH, Ltd.) | 20 | 577 | 1.75 | 1.5231 |
| E7 (BDH, Ltd.) | 20 | 644 | 1.7354 | 1.5175 |

TABLE III

LOSLO II software code written in C++ calculates the relative trajectories of two frequencies of electromagnetic radiation parallel when incident such that exiting dispersion can be minimized.

```
//------------------------------------------------------------
#ifndef ThreadH
#define ThreadH
//------------------------------------------------------------
#include <Classes.hpp>
//------------------------------------------------------------
class TMain : public TThread
{
private:
protected:
```

TABLE III-continued

LOSLO II software code written in C++ calculates the relative trajectories of two frequencies of electromagnetic radiation parallel when incident such that exiting dispersion can be minimized.

```
    void__fastcall Execute();
    void__fastcall Progress(void);
    void__fastcall OnTerminate();
public:
    __fastcall TMain(bool CreateSuspended);
};
//---------------------------------------------------------------------
#endif//--------------------------------------------------------------
#ifndef ImputH
#define ImputH
//---------------------------------------------------------------------
#include <Classes.hpp>
#include <Controls.hpp>
#include <StdCtrls.hpp>
#include <Forms.hpp>
#include <Buttons.hpp>
#include <Mask.hpp>
#include <Dialogs.hpp>
#include "cspin.h"
//---------------------------------------------------------------------
class TInputForm : public TForm
{
__published: //IDE-managed Components
    TLabel *Label1;
    TLabel *Label2;
    TLabel *Label3;
    TLabel *Label5;
    TLabel *Label6;
    TLabel *Label7;
    TLabel *Label8;
    TLabel *Label9;
    TLabel *Label10;
    TLabel *Label11;
    TLabel *Label12;
    TLabel *Label19;
    TMaskEdit *TInc2;
    TMaskEdit *TInc3;
    TMaskEdit *TOff2B;
    TMaskEdit *TOff2E;
    TMaskEdit *TOff2I;
    TMaskEdit *TOff3B;
    TMaskEdit *TOff3E;
    TMaskEdit *TOff3I;
    TMaskEdit *TTol1;
    TBitBtn *Done;
    TMaskEdit *TInc1;
    TBitBtn *Save;
    TBitBtn *Reset;
    TCheckBox *Inc1N;
    TCheckBox *Off3EN;
    TCheckBox *Off3BN;
    TCheckBox *Inc2N;
    TCheckBox *Inc3N;
    TLabel *Label4;
    TMaskEdit *TTol2;
    TMaskEdit *TTol3;
    TLabel *Label20;
    TLabel *Label21;
    TLabel *Label22;
  TLabel *Label23;
  TCSpinEdit *NumResults;
  TGroupBox *GroupBox1;
  TLabel *Label13;
  TLabel *Label14;
  TMaskEdit *TMat2LS1;
  TMaskEdit *TMat2HS1;
  TLabel *Label15;
  TMaskEdit *TMat3B;
  TMaskEdit *TMat3E;
  TGroupBox *GroupBox2;
  TLabel *Label24;
  TLabel *Label32;
  TLabel *Label25;
  TLabel *Label26;
  TLabel *Label27;
```

TABLE III-continued

LOSLO II software code written in C++ calculates the relative trajectories of two frequencies of electromagnetic radiation parallel when incident such that exiting dispersion can be minimized.

```
    TMaskEdit *TMat2LS2;
    TMaskEdit *TMat2HS2;
    TMaskEdit *TMat3HS2;
    TMaskEdit *TMat3LS2;
    TLabel *Label28;
    TLabel *Label29;
    TLabel *Label16;
    TLabel *Label17;
        void __fastcall DoneClick(TObject *Sender);
        void __fastcall SaveClick(TObject *Sender);
        void __fastcall ResetClick(TObject *Sender);
private:        // User declarations
    TStrings *Params;
public:
        __fastcall TInputForm(TComponent* Owner);
        virtual __fastcall ~TInputForm(void);
};
//---------------------------------------------------------------------------
extern PACKAGE TInputForm *InputForm;
//---------------------------------------------------------------------------
#endif//---------------------------------------------------------------------
#ifndef OutputTH
#define OutputTH
//---------------------------------------------------------------------------
#include <Classes.hpp>
#include <Controls.hpp>
#include <StdCtrls.hpp>
#include <Forms.hpp>
#include <ComCtrls.hpp>
#include <Dialogs.hpp>
#include <Menus.hpp>
#include <Buttons.hpp>
#include "LED.h"
//---------------------------------------------------------------------------
class TMainForm: public TForm
__published: // IDE-managed Components
    TLabel *Label1;
    TLabel *Label2;
    TLabel *Label3;
    TLabel *Label6;
    TLabel *Label7;
    TLabel *Label8;
    TStatusBar *StatusBar1;
    TMainMenu *MainMenu;
    TMenuItem *File1;
    TMenuItem *Open1;
    TMenuItem * Save;
    TMenuItem *N2;
    TMenuItem *Print1;
    TMenuItem *N1;
    TMenuItem *Exit1;
    TOpenDialog *OpenDialog;
    TSaveDialog *SaveDialog;
    TMenuItem *Parameters1;
    TMenuItem *Set1;
    TBitBtn *Start;
    TMenuItem *SaveAs;
    TLabel *Label12;
    TMenuItem *Clear1;
    TListBox *List;
    TLabel *Label4;
    TLabel *Label5;
    TProgressBar *ProgressBar;
        void __fastcall Open1Click(TObject *Sender);
        void __fastcall SaveClick(TObject *Sender);
        void __fastcall Exit1Click(TObject *Sender);
        void __fastcall Set1Click(TObject *Sender);
        void __fastcall SaveAsClick(TObject *Sender);
        void __fastcall StartClick(TObject *Sender);
        void __fastcall Clear1Click(TObject *Sender);
        void __fastcall StartStop(void);
    void __fastcall Print1Click(TObject *Sender);
private:        // User declarations
public:         // User declarations
        __fastcall TMainForm(TComponent* Owner);
```

TABLE III-continued

LOSLO II software code written in C++ calculates the relative trajectories of two frequencies of electromagnetic radiation parallel when incident such that exiting dispersion can be minimized.

```
    virtual__fastcall~TMainForm(void);
    double Results[999];
};
//------------------------------------------------------------------------
extern PACKAGE TMainForm *MainForm;
//------------------------------------------------------------------------
#endif#include <vcl.h>
#pragma hdrstop
USERES("Loslo.res");
USEFORM("OutputT.cpp", MainForm);
USEFORM("Imput.cpp", InputForm);
USEUNIT("Convert.cpp");
USEUNIT("Thread.cpp");
//------------------------------------------------------------------------
WINAPI WinMain(HINSTANCE, HINSTANCE, LPSTR, int)
{
    try
    {
        Application->Initialize();
        Application->Title = "Loslo II";
        Application->CreateForm(__classid(TMainForm), &MainForm);
        Application->CreateForm(__classid(TInputForm), &InputForm);
        Application->Run();
    }
    catch (Exception &exception)
    {
        Application->ShowException(&exception);
    }
    return ();
}
//------------------------------------------------------------------------
//------------------------------------------------------------------------
#include <vcl.h>
#include <Printers.hpp>
#pragma hdrstop
#include "Convert.h"
#include "OutputT.h"
#include "Imput.h"
#include "Thread.h"
//------------------------------------------------------------------------
#pragma package(smart_init)
//#pragma link "CustomRichEdit1"
#pragma link "LED"
#pragma resource "*.dfm"
TMainForm *MainForm;
TMain *Equate;
//------------------------------------------------------------------------
__fastcall TMainForm::TMainForm(TComponent* Owner)
:TForm(Owner)
{
}
//------------------------------------------------------------------------
__fastcall TMainForm::~TMainForm(void)
{
}
//------------------------------------------------------------------------
void__fastcall TMainForm::Open1Click(TObject *Sender)
{
    OpenDialog->FileName ="";
    if(OpenDialog->Execute())
    {
        if(List->Items->Count >0)
        List->Items->LoadFromFile(OpenDialog->FileName);
        SaveDialog->FileName = OpenDialog->FileName;
    }
}
//------------------------------------------------------------------------
void__fastcall TMainForm::SaveClick(TObject *Sender)
{
    if(SaveDialog->FileName !="")
    {
        List->Items->SaveToFile(SaveDialog->FileName);
    }
    else SaveAsClick(Sender);
}
```

TABLE III-continued

LOSLO II software code written in C++ calculates the relative trajectories of two frequencies of electromagnetic radiation parallel when incident such that exiting dispersion can be minimized.

```
//----------------------------------------------------------------------
void __fastcall TMainForm::Exit1Click(TObject *Sender)
{
    Close();
}
//----------------------------------------------------------------------
void __fastcall TMainForm::Set1Click(TObject *Sender)
{
InputForm->ShowModal();
}
//----------------------------------------------------------------------
void __fastcall TMainForm::SaveAsClick(TObject *Sender)
{
    SaveDialog->Title="Save As";
    if (SaveDialog->Execute())
    {
        List->Items->SaveToFile(SaveDialog->FileName);
    }
}
//----------------------------------------------------------------------
void __fastcall TMainForm::StartClick(TObject *Sender)
{
    if(Start->Caption == "Next")
    {
        Start->Caption = "Stop";
        List->Clear();
        Equate->Resume();
    }
    else
    {
        if(Start->Caption == "Start")
        {
            List->Clear();
            Start->Caption="Stop";
            Equate = new TMain(false);
        }
        else
        {
            StartStop();
            Start->Enabled=false;
        }
    }
}
//----------------------------------------------------------------------
void __fastcall TMainForm::Clear1Click(TObject *Sender)
{
    List->Clear();
}
//----------------------------------------------------------------------
void __fastcall TMainForm::StartStop()
{
    if(Start->Caption == "Start") Start->Caption = "Stop";
    else Start->Caption = "Start";
}
//----------------------------------------------------------------------
void __fastcall TMainForm::Print1Click(TObject *Sender)
{
    MainForm->ActiveControl = List;
    Print();
}
//----------------------------------------------------------------------
//----------------------------------------------------------------------
#include <vcl.h>
#pragma hdrstop
#include "Imput.h"
//----------------------------------------------------------------------
#pragma package(smart_init)
#pragma link "cspin"
#pragma resource "*.dfm"
TInputForm *InputForm;
//----------------------------------------------------------------------
__fastcall TInputForm::TInputForm(TComponent* Owner)
    :TForm(Owner)
{
  Params = new TStringList;
```

TABLE III-continued

LOSLO II software code written in C++ calculates the relative trajectories of two frequencies of electromagnetic radiation parallel when incident such that exiting dispersion can be minimized.

```
}
//------------------------------------------------------------------------
__fastcall TInputForm::~TInputForm(void)
{
  delete Params;
}
//------------------------------------------------------------------------
void __fastcall TInputForm::DoneClick(TObject *Sender)
{
    InputForm->Close();
}
void __fastcall TInputForm::SaveClick(TObject *Sender)
{
// Params->Add(
}
//------------------------------------------------------------------------
void __fastcall TInputForm::ResetClick(TObject *Sender)
{
//   Peram->Lines->LoadFromFile("Loslo.ini");
    // Peram->Lines->Insert(Peram->Lines,TInc1->Text);
}
//------------------------------------------------//--------------------------------
-------------------------------
#include <vcl.h>
#include <math.h>
#pragma hdrstop
#include "Thread.h"
#include "Convert.h"
#include "OutputT.h"
#include "Imput.h"
#pragma package(smart_init)
double convert(AnsiString);
int p;
//------------------------------------------------------------------------
void __fastcall TMain::Progress()
{
    MainForm->ProgressBar->Position = p;
}
//------------------------------------------------------------------------
__fastcall TMain::TMain(bool CreateSuspended): TThread(CreateSuspended)
{
    Priority = tpNormal;
    FreeOnTerminate = true;
}
//------------------------------------------------------------------------
void __fastcall TMain::Execute()
{
    double Inc1 = convert(InputForm->TInc1->Text);
    if(InputForm->Inc1N->Checked == true) Inc1 = Inc1 * -1;
    double Inc2 = convert(InputForm->TInc2->Text);
    if (InputForm->Inc2N->Checked == true) Inc2 = Inc2 * -1;
    double Inc3 = convert(InputForm->TInc3 ->Text);
    if (InputForm->Inc3N->Checked == true) Inc3 = Inc3 * -1;
    double Mat2L = convert(InputForm->TMat2LS1->Text);
    double Mat2H = convert(InputForm->TMat2HS1->Text);
    double Off2B = convert(InputForm->TOff2B->Text);
    double Off2 E = convert(InputForm->TOff2E->Text);
    double Off2I = convert(InputForm->TOff2I->Text);
    double Off3B = convert(InputForm->TOff3B->Text);
    if(InputForm->Off3BN->Checked == true) Off3B = Off3B * -1;
    double Off3E = convert(InputForm->TOff3E->Text);
    if(InputForm->Off3EN->Checked == true) Off3E = Off3E * -1;
    double Off3I = convert(InputForm->TOff3I->Text);
    double Mat3B = convert(InputForm->TMat3B->Text);
    double Mat3E = convert(InputForm->TMat3E->Text);
//       double Mat3I = convert(InputForm->TMat3I->Text);
    double Tol1 = convert(InputForm->TTol1->Text);
    double Tol2 = convert(InputForm->TTol2->Text);
    double Tol3 = convert(InputForm->TTol3->Text);
//------------------------------------------------------------------------
    double Mat3L = Mat3B;
    double Mat3H = Mat3B;
    double Off2 = Off2B;
    double Off3 = Off3B;
    double Ref1L = 0;
```

TABLE III-continued

LOSLO II software code written in C++ calculates the relative trajectories of two frequencies of electromagnetic radiation parallel when incident such that exiting dispersion can be minimized.

```
      double Ref1H = 0;
      double Ref2L = 0;
      double Ref2H = 0;
      double Ref3L = 0;
      double Ref3H = 0;
      double x = 0;
      double loop;
      if(Off2E!=Off2B&&Off2I!=0)loop = 1/((Off2E-Off2B)/Off2I)*100;
      double count = 0;
      double Range;
      Range = .2;
//    Synchronize(Progress);
      Mat3H = Mat3B;
      Mat3L = Mat3E;
      AnsiString Mat3La = AnsiString(Mat3L);
      AnsiString Mat3Ha = Ansistring(Mat3H);
      double Mat2LS2 = convert(InputForm->TMat2LS2->Text);
      double Mat2HS2 = convert(InputForm->TMat2HS2->Text);
      double Mat3LS2 = convert(InputForm->TMat3LS2->Text);
      double Mat3HS2 = convert(InputForm->TMat3HS2->Text);
      AnsiString Mat2LaS2 = AnsiString(Mat2LS2);
      Ansistring Mat2HaS2 = AnsiString(Mat2HS2);
      AnsiString Mat3LaS2 = AnsiString(Mat3LS2);
      AnsiString Mat3HaS2 = AnsiString(Mat3HS2);
double Ref1LS2 = 0;
double Ref1HS2 = 0;
double Ref2LS2 = 0;
double Ref2HS2 = 0;
double Ref3LS2 = 0;
double Ref3HS2 = 0;
while (Off2 <= Off2E)
{
   while(Off3 <= Off3E)
   {
      if(MainForm->Start->Enabled)
      {
         Ref3L = 0;
         Ref3H = 0;
         Ref1L = asin(sin(Inc1)/Mat2L);
         Ref1H = asin(sin(Inc1)/Mat2H);
         Ref2L = asin(Mat2L *sin(Ref1L-Off2)/Mat3L);
         Ref2H = asin(Mat2H *sin(Ref1H-Off2)/Mat3H);
         x = Mat3L *sin(Ref2L-Off3);
         if(fabs(x) < 1) Ref3L = asin(x)+Off2+Off3;
         x = Mat3H * sin(Ref2H-Off3);
         if(fabs(x) < 1) Ref3H = asin(x)+Off2+Off3;
         double Rel1 = Ref3L - Ref3H;
         if(fabs(Rel1) < Tol1 && (Ref3L != 0 && Ref3H != 0))
         {
            if(MainForm->List->Items->Count>20000)
            {
            MainForm->Start->Caption = "Next",
            Suspend();
            }
         Ref3LS2 = 0;
         Ref3HS2 = 0;
         Ref1LS2 = asin(sin(Inc1)/Mat2LS2);
         Ref1HS2 = asin(sin(Inc1)/Mat2HS2);
         Ref2LS2 = asin(Mat2LS2 * sin(Ref1LS2-Off2)/Mat3LS2);
         Ref2HS2 = asin(Mat2HS2 * sin(Ref1HS2-Off2)/Mat3HS2);
         x = Mat3LS2 * sin(Ref2LS2-Off3);
         if(fabs(x) < 1) Ref3LS2 = asin(x)+Off2+Off3;
         x = Mat3HS2 * sin(Ref2HS2-Off3);
         if(fabs(x) < 1) Ref3HS2 = asin(x)+Off2+Off3;
         double Rel1S2 = Ref3LS2 - Ref3HS2;
         if(fabs(Rel1S2) < Tol1 && (Ref3LS2 != 0 && Ref3HS2 != 0))
         {
            AnsiString Inc1a = Inc1;
            AnsiString Off2a = Off2;
            AnsiString Off3a = Off3;
            AnsiString Ref3L1 = AnsiString(Ref3L);
            AnsiString Ref3H1 = AnsiString(Ref3H);
            AnsiString Rel1a = AnsiString(Rel1);
            AnsiString Ref3L1S2 = AnsiString(Ref3LS2);
            AnsiString Ref3H1S2 = AnsiString(Ref3HS2);
```

TABLE III-continued

LOSLO II software code written in C++ calculates the relative trajectories of two
frequencies of electromagnetic radiation parallel when incident such that exiting dispersion
can be minimized.

```
            AnsiString Rel1aS2 = AnsiString(Rel1S2);
            if(Inc2 = = Inc1)
            {
                MainForm->List->Items->Add("1 " + Inc1a + " " + Off2a + " " + Off3a + " " + Mat3La
+ " " + Mat3Ha + " " + Ref3L1 + " " + Ref3H1 + " " + Rel1);
                MainForm->List->Items->Add("2 " + Inc1a + " " + Off2a + " " +" " + Off3a + " " +
Mat3LaS2 + " " + Mat3HaS2 + " " + Ref3L1S2 + " " + Ref3H1S2 + " " + Rel1S2);
            }
            else
            {
              Ref3L=0;
              Ref3H=0;
              Ref1L = asin(sin(Inc2)/Mat2L);
              Ref1H = asin(sin(Inc2)/Mat2H);
              Ref2L = asin(Mat2L * sin(Ref1L-Off2)/Mat3L);
              Ref2H = asin(Mat2H * sin(Ref1H-Off2)/Mat3H);
              x = Mat3L * sin(Ref2L-Off3);
              if(fabs(x) < 1) Ref3L = asin(x)+Off2+Off3;
              x = Mat3H * sin(Ref2H-Off3);
              if(fabs(x) < 1) Ref3H = asin(x)+Off2+Off3;
              double Rel2 = Ref3L - Ref3H;
              if(fabs(Rel2) < Tol2 && (Ref3L != 0 && Ref3H != 0))
              {
                Ref3LS2=0;
                Ref3HS2=0;
                Ref1LS2 = asin(sin(Inc3)/Mat2LS2);
                Ref1HS2 = asin(sin(Inc3)/Mat2HS2);
                Ref2LS2 = asin(Mat2LS2 * sin(Ref1LS2-Off2)/Mat3LS2);
                Ref2HS2 = asin(Mat2HS2 * sin(Ref1HS2-Off2)/Mat3HS2);
                x = Mat3LS2 * sin(Ref2LS2-Off3);
                if(fabs(x) < 1) Ref3LS2 = asin(x)+Off2+Off3;
                x = Mat3HS2 * sin(Ref2HS2-Off3);
                if(fabs(x) < 1) Ref3HS2 = asin(x)+Off2+Off3;
                double Rel2S2 = (Ref3LS2 - Ref3HS2);
                if(fabs(Rel2S2) < Tol3 && (Ref3LS2 != 0 && Ref3HS2 != 0))
                {
                  AnsiString Inc2a = Inc2;
                  AnsiString Ref3L2 = AnsiString(Ref3L);
                  AnsiString Ref3H2 = AnsiString(Ref3H);
                  AnsiString Rel2a = AnsiString(Rel2);
                  AnsiString Ref3L2S2 = AnsiString(Ref3LS2);
                  AnsiString Ref3H2S2 = AnsiString(Ref3HS2);
                  AnsiString Rel2aS2 = AnsiString(Rel2S2);
                  if(Inc3 = = Inc2)
                  {
                    MainForm->List->Items->Add("1 " + Inc1a + " " + Off2a + " " + Off3a + " " +
Mat3La + " " + Mat3Ha + " " + Ref3L1 + " " + Ref3H1 + " " + Rel1);
                    MainForm->List->Items->Add ("1 " + Inc2a + " " + Off2a + " " + Off3a + " " +
Mat3La + " " + Mat3Ha + " " + Ref3L2 + " " + Ref3H2 + " " + Rel2);
                    MainForm->List->Items->Add("2 " + Inc1a + " " + Off2a + " " + Off3a + " " +
Mat3LaS2 + " " + Mat3HaS2 + " " + Ref3L1S2 + " " + Ref3H1S2 + " " + Rel1S2);
                    MainForm->List->Items->Add ("2 " + Inc2a + " " + Off2a + " " + Off3a + " " +
Mat3LaS2 + " " + Mat3HaS2 + " " + Ref3L2S2 + " " + Ref3H2S2 + " " + Rel2S2);
                  }
                  else
                  {
                    Ref3L=0;
                    Ref3H=0;
                    Ref1L = asin(sin(Inc3)/Mat2L);
                    Ref1H = asin(sin(Inc3)/Mat2H);
                    Ref2L = asin(Mat2L * sin(Ref1L-Off2)/Mat3L);
                    Ref2H = asin(Mat2H * sin(Ref1H-Off2)/Mat3H);
                    x = Mat3L * sin(Ref2L-Off3);
                    if(fabs(x) < 1) Ref3L = asin(x)+Off2+Off3;
                    x = Mat3H * sin(Ref2H-Off3);
                    if(fabs(x) < 1) Ref3H = asin(x)+Off2+Off3;
                    double Rel3 = (Ref3L - Ref3H);
                    if(fabs(Rel3) < Tol3 && (Ref3L != 0 && Ref3H != 0))
                    {
                      Ref3LS2=0;
                      Ref3HS2=0;
                      Ref1LS2 = asin(sin(Inc3)/Mat2LS2);
                      Ref1HS2 = asin(sin(Inc3)/Mat2HS2);
                      Ref2LS2 = asin(Mat2LS2 * sin(Ref1LS2-Off2)/Mat3LS2);
                      Ref2HS2 = asin(Mat2HS2 * sin(Ref1HS2-Off2)/Mat3HS2);
```

TABLE III-continued

LOSLO II software code written in C++ calculates the relative trajectories of two
frequencies of electromagnetic radiation parallel when incident such that exiting dispersion
can be minimized.

```
            x = Mat3LS2 * sin(Ref2LS2-Off3);
            if(fabs(x) < 1) Ref3LS2 = asin(x)+Off2+Off3;
            x = Mat3HS2 * sin(Ref2HS2-Off3);
            if(fabs(x) < 1) Ref3HS2 = asin(x)+Off2+Off3;
            double Rel3S2 = (Ref3LS2 - Ref3HS2);
            if(fabs(Rel3S2) < Tol3 && (Ref3LS2 != 0 && Ref3HS2 != 0))
            {
               AnsiString Inc3a = Inc3;
               AnsiString Ref3L3 = AnsiString(Ref3L);
               AnsiString Ref3H3 = AnsiString(Ref3H);
               AnsiString Rel3a = AnsiString(Rel3);
               AnsiString Ref3L3S2 = AnsiString(Ref3LS2);
               AnsiString Ref3H3S2 = AnsiString(Ref3HS2);
               AnsiString Rel3aS2 = AnsiString(Rel3S2);
               MainForm->List->Items->Add("1 " + Inc1a + " " + Off2a + " " + Off3a + " " +
Mat3La + " " + Mat3Ha + " " + Ref3L1 + " " + Ref3H1 + " " + Rel1);
               MainForm->List->Items->Add ("1 " + Inc2a + " " + Off2a + " " + Off3a + " " +
Mat3La + " " + Mat3Ha + " " + Ref3L2 + " " + Ref3H2 + " " + Rel2);
               MainForm->List->Items->Add ("1 " + Inc3a + " " + Off2a + " " + Off3a + " " +
Mat3La + " " + Mat3Ha + " " + Ref3L3 + " " + Ref3H3 + " " + Rel3);
               MainForm->List->Items->Add("2 " + Inc1a + " " + Off2a + " " + Off3a + " " +
Mat3LaS2 + " " + Mat3HaS2 + " " + Ref3L1S2 + " " + Ref3H1S2 + " " + Rel1S2);
               MainForm->List->Items->Add ("2 " + Inc2a + " " + Off2a + " " + Off3a + " " +
Mat3LaS2 + " " + Mat3HaS2 + " " + Ref3L2S2 + " " + Ref3H2S2 + " " + Rel2S2);
               MainForm->List->Items->Add ("2 " + Inc3a + " " + Off2a + " " + Off3a + " " +
Mat3LaS2 + " " + Mat3HaS2 + " " + Ref3L3S2 + " " + Ref3H3S2 + " " + Rel3S2);
            }
           }
          }
         }
        }
       }
      }
     }
    }
   }
   else
   {
      Mat3L = 2;
      Mat3H = 2;
      Off2 = 2;
      Off3 = 2;
      Off2B = 2;
      Off3B = 2;
      MainForm->Start->Enabled = true;
   }
   Off3 =0 Off3 + Off3I;
  }
  Off2 = Off2 + Off2I;
  Off3 = Off3B;
  count = count + loop;
  p = int(count);
  Synchronize(Progress);
 }
 p = 0;
 Synchronize(Progress);
 if(MainForm->Start->Caption == "Stop") MainForm->Start->Caption = "Start";
 MainForm->Start->Enabled=true;
}
//-----------------------------------------------------------------------
```

Figure 8:
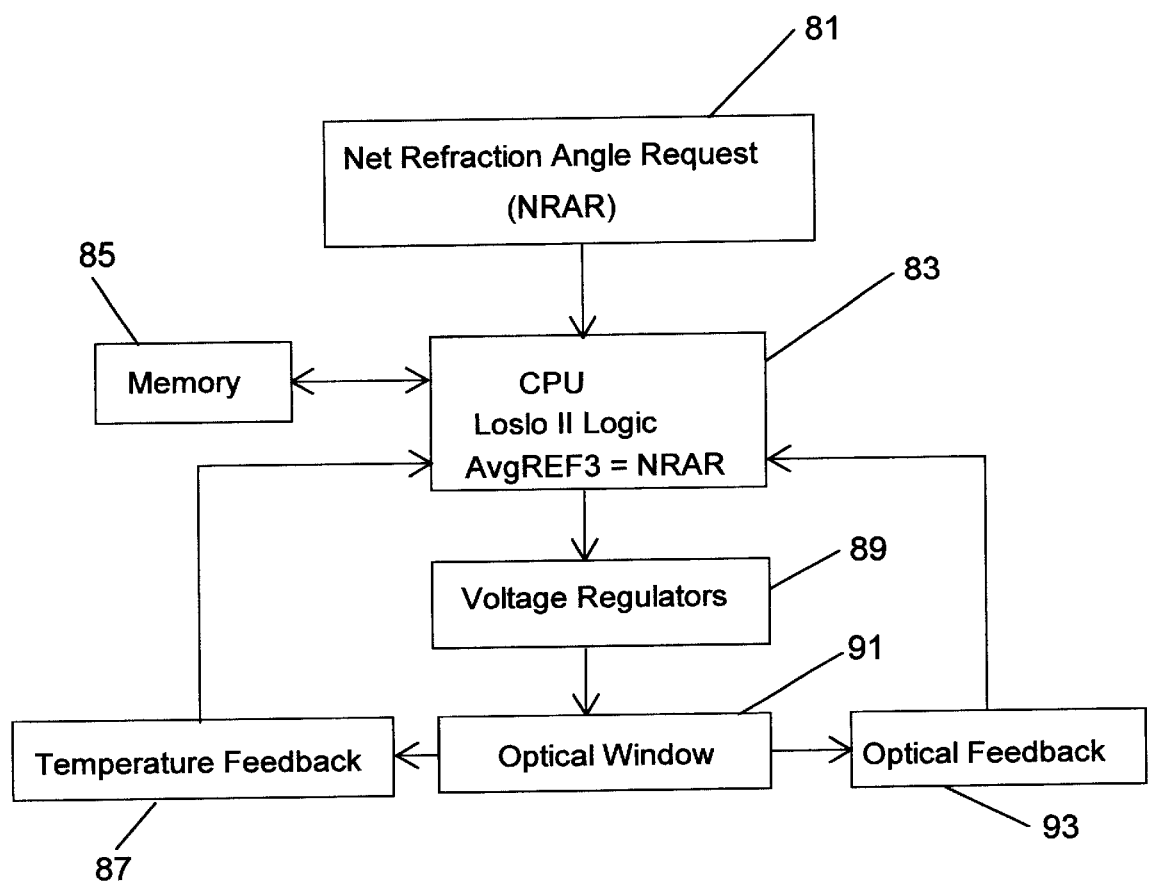
FIG. 8. is a flowchart describing the process by which the net refractive angle of a couplet is varied while dispersion in minimized.

FIG. 8 is a flowchart that describes the automatic operation of the present invention. The process is initiated by a net refraction angle request NRAR 81. A user or automatic process requests a desired net angle of refraction. This information is received by a CPU 83 which utilizes logic to select the voltage to generate the refractive states in Mat2 and Mat3 at which the Ref3 angles equal the NRAR with minimal dispersion. These mathematical values are generated using LosloII logic and a memory 85. To achieve this, the CPU calls to the memory 85 from which to select values. The memory contains arrays of information similar to that in Table I except over a much larger range of operation. The refractive indices from 1 or more materials over a range of many temperatures, voltages, incident angles, and frequencies may be contained in the memory. The CPU also receives temperature information 87 from an optical window 91 to ensure that it selects refractive indices corresponding to the current operating temperature. Once the CPU has selected the proper voltages to be applied to each material, it sends corresponding signals to voltage regulators 91 which in turn apply the correct voltage to the optical window. In the case of the couplet described in FIG. 5, each circuit, 49 and 51, would receive a respective selected voltage. In the case of a cell couplets in array, a series of many differing voltages may be applied to each couplet half of each array cell. This is the case in FIG. 12 where a variable focal length is achieved and a focal point is approximated by applying a number of differing voltages to each concentric couplet half. The refraction required varies moving from the center outward, a multitude of voltages provides this gradient. In this way, the desired refraction is achieved with minimum dispersion. The optical window can continually be adjusted across its range of refractive indices always with minimized dispersion. An additional fie tuning may be provided in the form of optical feedback 93. Optical feedback checks the actual refraction and dispersion achieved and reports back to the CPU. The CPU compares the actual to the expected and fme-tunes the applied voltages accordingly.

Calculations used by CPU

Rel is minimized, the wavelengths passing through both Mat2 at Off2 and Mat3 at Off3 are nearly parallel and as such chromatic distortion can not be detected by the human eye. (Particularly when the distance that the wavelengths travel through the refractive fluids is minimized.)

Table IV describes the refractive angles that can be achieved by a couplet with a first apex angle of 0.302 and a second apex angle of −0.735. (To reiterate, Off2 and Off3 are apex angles.) In the first state a refraction angle of 0.324 is achievable while maintaining a relative tolerance of 0.000308. In the second state a refraction angle of 0.234 is achievable while maintaining a relative tolerance of 0.000307.

Table IV describes the refractive angles achievable in the no and ne states of the materials in Table 1 at one set of angles with a relative tolerance of .000308. The same angles can be used to generate different refractive angles when voltage is altered to a range between the no and ne states.

| State | Inc | Off2 | Off3 | nMat 2 I&h | nMat3 E&h | Ref 3H | Ref3L | Rel |
|---|---|---|---|---|---|---|---|---|
| 1 | 0 | 0.302 | −0.735 | 1.837 1.802 | 1.718 1.7041 | 0.32425 | 0.32456 | 3.08 E-4 |
| 2 | 0 | 0.302 | −0.735 | 1.575 1.563 | 1.515 1.5098 | 0.23401 | 0.2337 | 3.07 E-4 |

Using Snell's Law to describe the two wavelengths' trajectories through each material in the refractive states incorporates the following mathematical logic.

$$Ref1L = Inv\ sin(Mat1 * Sin(Inc)/Mat2L)$$

$$Ref1H = Inv\ sin(Mat1 * Sin(Inc)/Mat2H)$$

$$Ref2L = Inv\ sin(Mat2L * Sin(Ref1L - Off2)/Mat3L)$$

$$Ref2H = Inv\ sin(Mat2H * Sin(Ref1H - Off2)/Mat3H)$$

$$Ref3L = Inv\ sin(Mat3L * Sin(Ref2L - Off3)/Mat1)$$

$$Ref3H = Inv\ sin(Mat3H * Sin(Ref2H - Off3)/Mat1)$$

$$Rel = absolute\ value\ (Ref3L - Ref3H)$$

Minimizing Rel

When Ref3L=Ref3H, Rel=0. This minimizes Rel.

It follows that voltage applied to Mat2 and voltage applied to Mat3 must achieve the desired net refraction (Ref3's) whereby at the same time Rel is minimized.

The program calculates the relative trajectory of two light wavelengths that have started (parallel) as parts of one ray. These two wavelengths subsequently have passed through Mat2 (with a prism angle of Off2) and Mat3 (with a prism angle of Off3). The two wavelengths' relative resultant trajectories are set equal to Rel. If allowed to change voltage of Mat2 independent of, a corresponding change in voltage applied to Mat3, will cause dispersion between the various wavelengths of light to also increase. Without remediation from voltage applied to Mat3, the human eye detects this dispersion as chromatic distortion. The objective of the computer programming instructions is to eliminate this chromatic distortion by minimizing net relative dispersion. (The goal is to cause the two light wavelengths that entered the system parallel to one another also to exit the system parallel to one another.) Using the refractive indices of Mat2 and Mat3 at different wavelengths, the software when interfacing with a database/memory, and voltage regulating hardware, will vary voltage to achieve desired refractive angles with minimized dispersion (Rel is minimized). When It is noteworthy that if Mat2 in State 1 (operating at a suitable Off2) alone were used to achieve the refraction of 0.324 radians, the corresponding dispersion would be 0.016 radians. This is 52 times greater than the dispersion resulting from the present mention in the present illustration. Stated another way, the present invention (in this example) can achieve the same refraction as the prior art but with 2% of the dispersion. Further exploration of all available materials in all possible combinations using the computer applications of the present invention will enable even further lowering of dispersion and greater net refraction.

Figure 9:
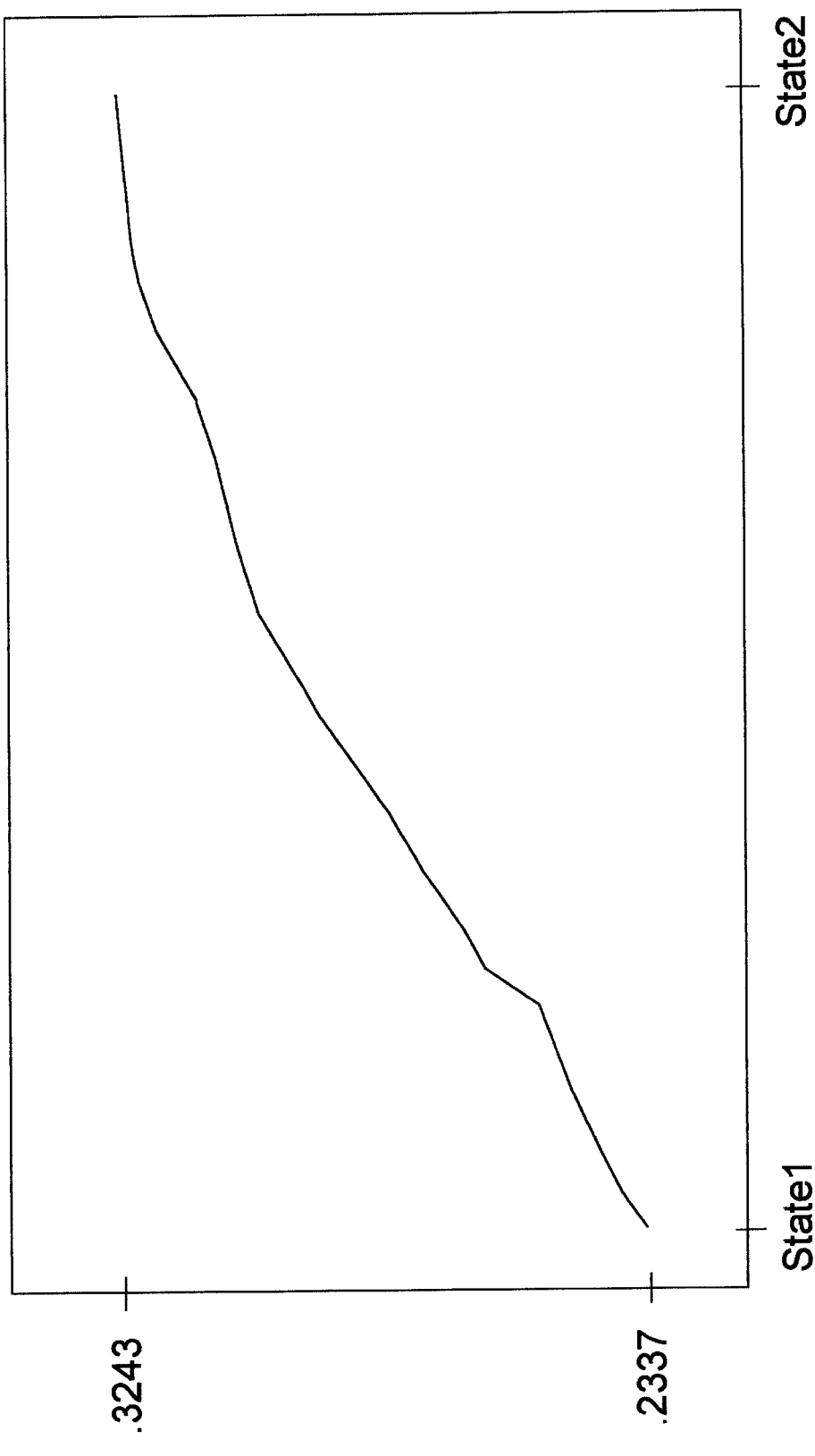
FIG. 9. an example net refraction curve from State 1 through State 2 of the present invention.

FIG. 9 uses the data in Table IV to illustrate an example net refraction curve describing the operating range of the present invention from the State 1 through the State 2 range of possibilities. Any net refraction angle between 0.2337 radians and 0.3243 radians can be achieved with minimized dispersion utilizing the present invention with the illustrated materials at the selected apex angles.

Description and Operation of the Second Preferred Embodiments

Figure 10:
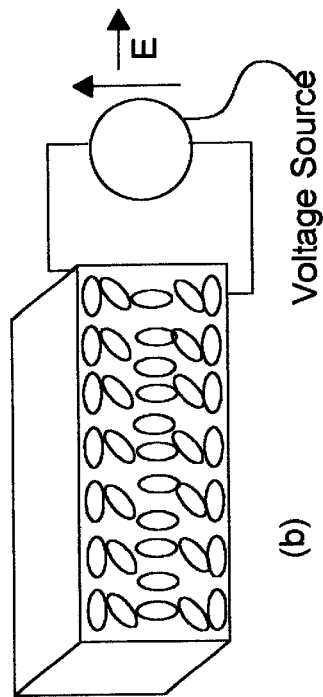
FIG. 10. Prior Art, U.S. Pat. No. 4,037,929 (Bricot et al., 1977), illustrates a voltage variable liquid crystal lens wherein the focal length is variable as a function of voltage.
Figure 10:
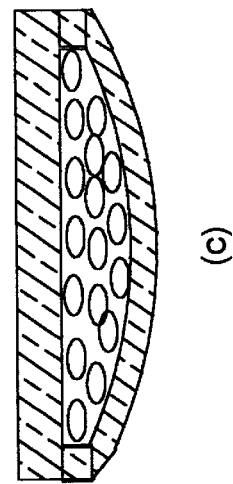
Figure 10:
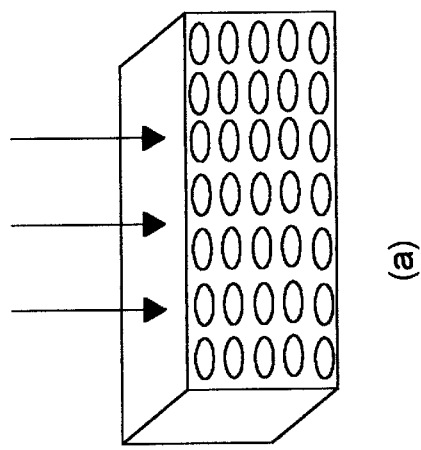

FIG. 10. Prior Art, U.S. Pat. No. 4,037,929 (Bricot et al., 1977), illustrates a voltage variable liquid crystal lens wherein the focal length is variable as a function of voltage. The prior art has been using liquid crystals to produce variable focal lengths for at least 23 years. No attempt has been made to minimize dispersion across the operating range of an electro-optic lens. The present invention solves the problem of dispersion in a lens that operates across a range of refractive indices.

Figure 11:
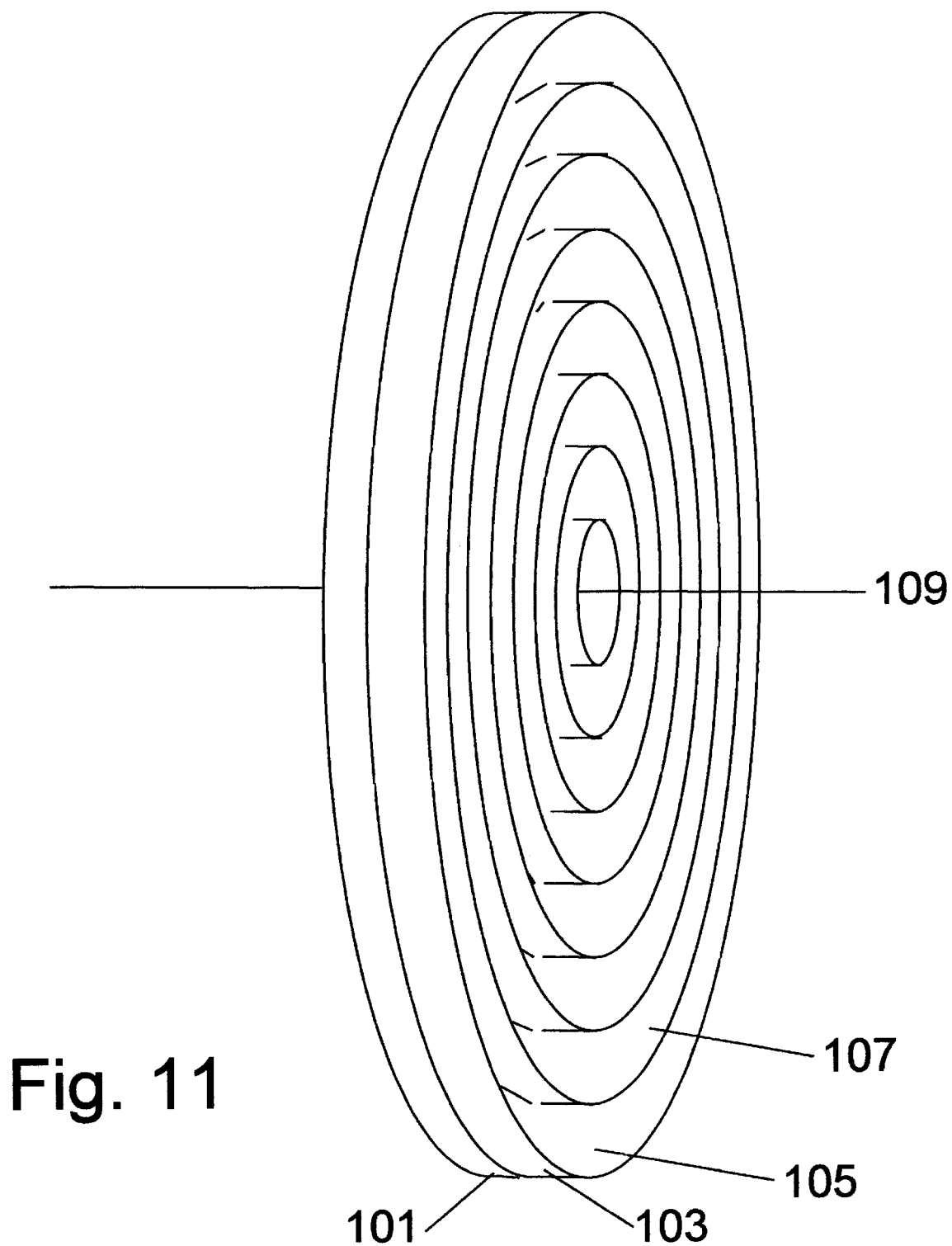
FIG. 11. illustrating a dispersion minimized variable focal length lens embodiment of the present invention.

FIG. 11. illustrates a variable focal length lens embodiment of the present invention with minimized dispersion. An optical axis 109 is at the center of a transparent rigid structure employing a first series of concentric Fresnel zones such as 107 and 105 and a second series of concentric Fresnel zones on the backside of the lens 101 (couplet zones on the backside of the lens are not visible but look similar to the side currently in view).

Figure 12:
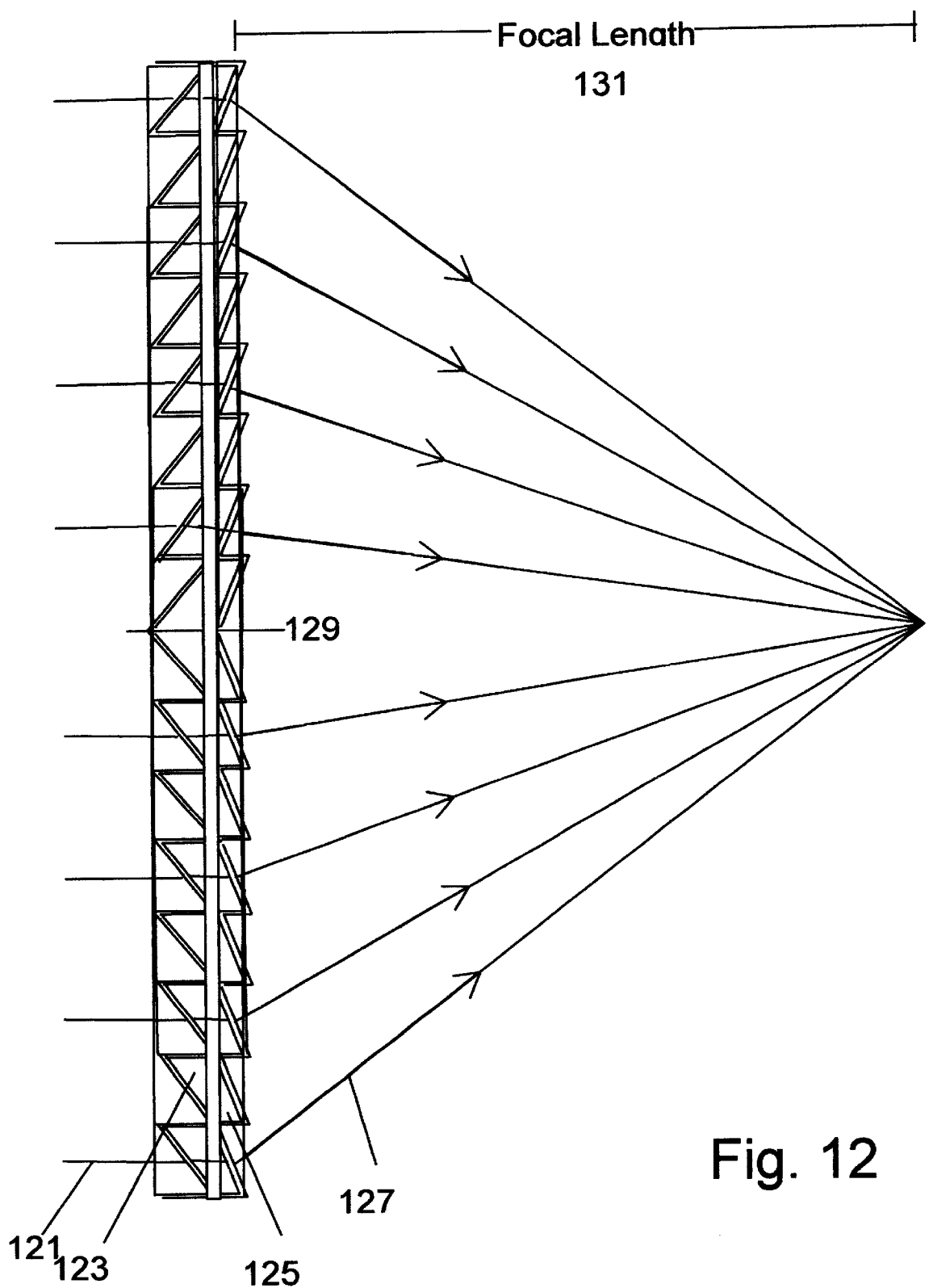
FIG. 12. is a cutaway view of the lens of FIG. 11 with ray tracing included.

FIG. 12. illustrates a variable focal length lens of FIG. 11 in a cutaway profile view. It contains the same components as FIG. 5 except whereas FIG. 5 consists of flat surfaces and prism like structures, the FIG. 12 components are arranged in concentric circles. Otherwise, the description, operation, and software associated with FIGS. 5, 6, 7, 8, and 9 all similarly apply to the concentric Fresnel prism structure of FIGS. 11 and 12.

A first multi-frequency beam enters a first electro-optic component similar to a first material 123. The beam is refracted and dispersed, whereupon it enters a second electro-optic component similar to a second material 125. Upon exit the second material the beam is a refracted beam 127. As with the previous embodiment, if 121 consists of two parallel frequencies entering the optic, two refracted and parallel (within a controllable tolerance) beams exit at 127. As previously discussed, the voltage applied to each half of concentric couplets must be controlled individually to produce a common focal length and an approximated variable focal point. A similar structure but with curved sides can be used to provide a variable focal length each length having a real focal point.

Additional Embodiments

Two frequencies within the visible spectrum are shown, it is understood that the present invention can apply to other frequencies within or outside of the visible range.

The first material and second material may be the same material.

The first offset angle and the second offset angle may be equal.

The first material and the second material need not be at the same temperature.

The term "frequency" as used herein can be interchanged with the word "wavelength".

The phrase "electro-optic material" can be used in place of the phrase "liquid crystal" herein. Electro-optic is defined as any material whose refractive index varies with the intensity of an applied electric field. A nematic liquid crystal being one such a material.

"Net refraction" refers to the refraction that results from components in series.

The illustration herein has two materials transitioning through states in the same direction from ne to no. This is not always the optimal combination, they may transition from no to ne, or one may transition from no to ne while the other transitions from ne to no.

The present example best illustrates correction of dispersion in the no and ne states only, it is understood that the range of dispersion between these two states can also be corrected by the means disclosed herein. This can easily be accomplished using a memory and computer logic to control voltage to each half of a couplet to achieve the desired refraction while minimizing dispersion.

The two liquid crystal materials in couplet described herein were selected based upon easily documented refractive indices at common temperatures in two states at common frequencies. Many other pairs of liquid crystals in couplet are possible to achieve refraction with minimized dispersion as described herein.

Disclosed herein is one cell of the present invention to describe liquid crystal induced refraction with minimal dispersion. It is understood that many such cells can be used together in arrays or in sequence.

The structures described herein are very useful in the embodiment of the variable view window.

The computer software disclosed herein contains functionality beyond what is required to operate the disclosed liquid crystal couplet cell between two states of two materials. The logic and mathematical algorithms easily can interface with a database memory that describes the refractive state of multiple liquid crystal materials across a range of electromagnetic frequencies and temperatures. It solves the mathematical problem of how to move the net refraction of the couplet through a range with minimal dispersion.

Voltage is used herein as the method to vary the refractive index of a liquid crystal. It is understood that the invention described herein can be used to vary refractive index through other means including but not limited to temperature, pressure, and magnetic field.

The lens embodiment disclosed herein minimizes dispersion in a Fresnel type lens in a first and second state utilizing the same data and angles utilized in the prism couplet example. This is done for ease of illustration. It is understood that the invention herein can be used to minimize dispersion of a liquid crystal lens whereby two crystals in series each having at least one curved surface can be used to form a range of focal points with minimized dispersion.

The example disclosed herein uses a common incident angle of zero. The invention disclosed herein is fully capable of producing multiple net refraction results with minimal dispersion using any incident angle. Indeed, the invention disclosed herein can use incident angles that differ between the electromagnetic frequencies. In such case, the two frequencies would enter non-parallel and exit non-paralell.

The current disclosure describes minimized dispersion of two parallel beams only. The invention described herein and the computer software disclose has the capability of achieving variable refraction while minimizing dispersion across multiple incident angles simultaneously.

Each liquid prism couplet can also be used to change a window between a transparent and opaque state by increasing the refraction within either liquid crystal prism beyond the critical angle such that total internal reflection is achieved. This is a contrast to other opaque windows that use incoherence to produce the opacity.

Variable mirrors—The structures disclosed herein can be used to form variable view mirrors wherein one of the surfaces reflects light after the light is refracted by a prism. Alternately, a reflective fluid such as mercury can be contained in any of the prism voids described herein to form a mirror capable of a wide range of reflection angles while remaining in a relatively stationary position.

Computer Monitors and TV screens can be viewed from any angle using the variable structures disclosed herein.

A memory or database is described herein as a means for the CPU to retrieve refractive indices for Mat2 and Mat3 according to apex angle, voltage, frequency, and temperature. It is recognized that formulas describing refractive indices with regard to these variables could be used instead of the memory or database.

The preceding is not to be construed as any limitation on the claims and uses for the structures disclosed herein.

Previous Disclosures

Previous disclosures in the form of patent applications and provisional applications have been filed by the present inventor. They include the techniques for reducing the dispersion associated with refraction using a fluid with a refractive index to counteract the chromatic distortion effects of dispersion. Previous filings include the use of computer software and hardware to actuate surfaces, monitor temperature, control temperature, and reduce dispersion. Such techniques as previously disclosed by the present applicant can also be used with the present structures disclosed herein but have not be rediscussed to avoid redundancy.

Advantages

Many advantages of the preferred embodiment are present because the user can see many different views from any given vantage point which would otherwise not be possible. Firstly, high refraction is achievable. A range greater than 1.5 radians is possible for a normal ray. Secondly, dispersion can be reduced to a low tolerance level of below 0.0001 radians across the visible spectrum. Thirdly, in effect the structure has no moving parts. Fourthly, this structure is compatible with automobile window characteristics. Fifthly, for novelty, the window can be adjusted to maximize the color separation caused by dispersion. For example, the user can maximize color separation to provide a uniquely distorted view through the window.

Benefits of the Present Invention.

The invention disclosed herein is a new kind of lens, screen or window. Heretofore, viewing angles possible through a lens, screen or window were only adjustable by moving the viewer's viewing angle. If the viewer looked out these windows at a norm angle to the window, they would see an object at the norm angle to the window. The present invention enables a viewer to look through a prismatic window at a norm to the window yet to see objects located in any selected direction other than at the norm angle to the window. Such a window may be used to create a completely new view in a room that may otherwise have an undesirable view. Moreover, under the present invention, a viewer may view at an infinite number of angles while looking from the perspective of a single angle. Under the present invention, a user may stay in one position and look in different directions through a window as desired. This is desirable within buildings to view sights otherwise not possible or practicable and within automobiles to eliminate blind spots. The alternate views made possible by the present invention are also of interest to the retail industry. The retail industry can display merchandise in new ways. Through a variable view window, shoppers can see merchandise within a window display from greater angles than are otherwise possible. Retail display cases and refrigerated display cases can also use the art disclosed herein to enable consumers to view products within from angles not otherwise possible.

Conclusion, Ramifications, and Scope

Thus the reader will see that the variable view window of this invention provides a highly functional and reliable means to alter the refraction provided through a optical structure with minimized dispersion. This is useful from aesthetic and functional perspectives.

Many structures can be envisioned across many fields of endeavor which can utilize the invention disclosed herein.

Accordingly, the scope of the invention should be determined not by the embodiment(s) illustrated, but by the appended claims and their legal equivalents.

What is claimed:

1. An achromatic optical assembly comprising a plurality of refractive elements arranged along an optical axis, said plurality of elements including: a first refractive element formed of a first electro-optic material operable in at least two refractive states, and having first and second refracting surfaces disposed in non-parallel planes through which at least two different wavelengths of electromagnetic radiation passes; a second refractive element formed of a second electro-optic material operable in at least two refractive states, and having first and second refractive surfaces disposed in non-parallel planes through which at least two different wavelengths of electromagnetic radiation passes; means to vary the refractive state of said first electro-optic material between said at least two refractive states, and means to vary the refractive state of said second electro-optic material between said at least two refractive states; wherein, in a first condition, the refractive index of said first electro-optic material is in a first state and the refractive index of said second electro-optic material is in a first state, such that the rays of said electromagnetic radiation of at least two different wavelengths are brought to focus at a fist focal length in such a way that rays which are parallel when incident upon said first refracting surface of said first electro-optic material, remain parallel when exiting said second refracting surface of said second electro-optic material; and wherein, in a second condition, the refractive index of said first electro-optic material is in a second state and the refractive index of said second electro-optic material is in a second state, such that rays of said electromagnetic radiation of at least two different wavelengths are brought to focus at a second focal length in such a way that rays which are parallel when incident upon said first refracting surface of said first electro-optic material, remain parallel when exiting said second refracting surface of said second electro-optic material.

2. The achromatic optical assembly of claim 1 wherein said first non-parallel plane in which said first surface of said first electro-optic material is disposed is part of a conic section which is formed by said first surface of said first electro-optic material, said conic section being symmetric about said axis.

3. The achromatic optical assembly of claim 2 wherein said first electro-optic material is arranged in a concentric array of structures each of said structures having a said first surface which forms a conic section symmetric about said axis.

4. The invention of claim 1 wherein said means to vary the refractive state of said first electro-optic material is a change of voltage.

5. The invention of claim 1 further comprising a means to monitor the temperature of at least one of said electro-optic materials.

6. The invention of claim 1 wherein at least one electro-optic material through which said electromagnetic radiation passes is a liquid crystal.

7. The invention of claim 1 further comprising a computer connected so as to send a signal to control the refractive state of at least one said electro-optic material.

8. An achromatic optical assembly comprising a plurality of refractive elements through which electromagnetic radiation passes in series, said plurality of elements including: a first refractive element formed of a first electro-optic material operable in at least two refractive states, and having first and second refracting surfaces disposed in non-parallel planes through which at least two different wavelengths of electromagnetic radiation passes; a second refractive element formed of a second electro-optic material operable in at least two refractive states, and having first and second refractive surfaces disposed in non-parallel planes through which at least two different wavelengths of electromagnetic radiation passes; means to vary the refractive state of said first electro-optic material between said at least two refractive states, and means to vary the refractive state of said second electro-optic material between said at least two refractive states; wherein, in a first condition, the refractive index of said first electro-optic material is in a first state and the refractive index of said second electro-optic material is in a first state, such that the rays of said electromagnetic radiation of at least two different wavelengths which are parallel when incident upon said first refracting surface of said first electro-optic material, remain parallel when exiting said second refracting surface of said second electro-optic material; and wherein, in a second condition, the refractive index of said first electro-optic material is in a second state and the refractive index of said second electro-optic material is in a second state, such that rays of said electromagnetic radiation of at least two different wavelengths which are parallel when incident upon said first refracting surface of said first electro-optic material, remain parallel when exiting said second refracting surface of said second electro-optic material.

9. The invention of claim 8 wherein said means to vary the refractive state of said first electro-optic material is a change/of voltage.

10. The invention of claim 8 further comprising a means to monitor the temperature of at least one of said electro-optic materials.

11. The invention of claim 8 wherein at least one electro-optic material through which said electromagnetic radiation passes is a liquid crystal.

12. The invention of claim 8 further comprising a computer connected so as to send a signal to control the refractive state of at least one said electro-optic material.

* * * * *